(12) United States Patent
Perras et al.

(10) Patent No.: US 9,736,733 B2
(45) Date of Patent: Aug. 15, 2017

(54) NETWORK STACK VIRTUALIZATION

(71) Applicant: InterDigital Patent Holdings, Inc., Wilmington, DE (US)

(72) Inventors: Michelle Perras, Montréal (CA); Alexander Reznik, Pennington, NJ (US); Prabhakar Chitrapu, Blue Bell, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 14/440,993

(22) PCT Filed: Oct. 30, 2013

(86) PCT No.: PCT/US2013/067460
§ 371 (c)(1),
(2) Date: May 6, 2015

(87) PCT Pub. No.: WO2014/074364
PCT Pub. Date: May 15, 2014

(65) Prior Publication Data
US 2015/0304892 A1   Oct. 22, 2015

Related U.S. Application Data

(60) Provisional application No. 61/723,360, filed on Nov. 7, 2012.

(51) Int. Cl.
*H04W 36/16* (2009.01)
*H04W 36/00* (2009.01)
(Continued)

(52) U.S. Cl.
CPC ..... *H04W 36/0005* (2013.01); *H04L 61/2007* (2013.01); *H04L 69/161* (2013.01); *H04W 80/04* (2013.01)

(58) Field of Classification Search
CPC  H04W 36/0005; H04W 80/04; H04L 69/161; H04L 61/2007; H04L 29/12
See application file for complete search history.

(56) References Cited

U.S. PATENT DOCUMENTS

2004/0028009 A1\* 2/2004 Dorenbosch ...... H04W 36/0011
370/329
2007/0104145 A1 5/2007 Jan
(Continued)

FOREIGN PATENT DOCUMENTS

WO   WO-2008037474 A2   4/2008

OTHER PUBLICATIONS

Katayama et al., "Slice Extension of Network Infrastructure into Virtualization-Enabled Terminal Device, Coordinating Network Management System With Terminal Device Management System into Network Virtualization", Aug. 23, 2012, pp. 1-4.
(Continued)

*Primary Examiner* — Lakeram Jangbahadur
(74) *Attorney, Agent, or Firm* — Condo Roccia Koptiw LLP

(57) ABSTRACT

Embodiments contemplate network stack virtualization which may be virtualization of a portion of the communication stack, such as the protocol stack, in some embodiments, multiple functionally of independent copies of the protocol stack may be simultaneously running on the terminal and/or serving the needs of different applications. This may allow independent operation from the application point of view, including connectivity to different networks with different identities. Embodiments contemplate that any number of such virtual network stacks can be instantiated, perhaps in some embodiments depending on the characteristics of an active application. Embodiments also contemplate the presentation of multiple allocated internet protocol (IP) addresses that may have sufficient information to enable
(Continued)

an intelligent source IP address selection on the WTRU. The WTRU may be able to select an optimum IP address, perhaps in some embodiments depending on which application may be started.

10 Claims, 20 Drawing Sheets

(51) Int. Cl.
      *H04L 29/12*       (2006.01)
      *H04L 29/06*       (2006.01)
      *H04W 80/04*       (2009.01)

(56) References Cited

U.S. PATENT DOCUMENTS

2008/0123604 A1* 5/2008 Shimizu .............. H04L 12/4633
                                                      370/338
2010/0128696 A1* 5/2010 Fantini .............. H04L 29/12028
                                                      370/331

OTHER PUBLICATIONS

Nicholson et al., "Juggler: Virtual Networks for Fun and Profit", IEEE Transactions on Mobile Computing, vol. 9, No. 1, Jan. 2010, pp. 31-43.
Matos, Alfredo, et al., "Preserving Privacy in Mobile Environments with Virtual Network Stacks", IEEE GLOBECOM 2007-IEEE Global Telecommunications Conference, Nov. 2007, pp. 1-6.

* cited by examiner

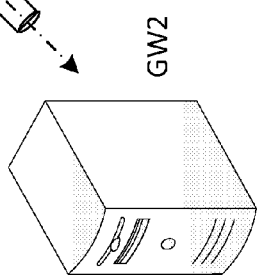
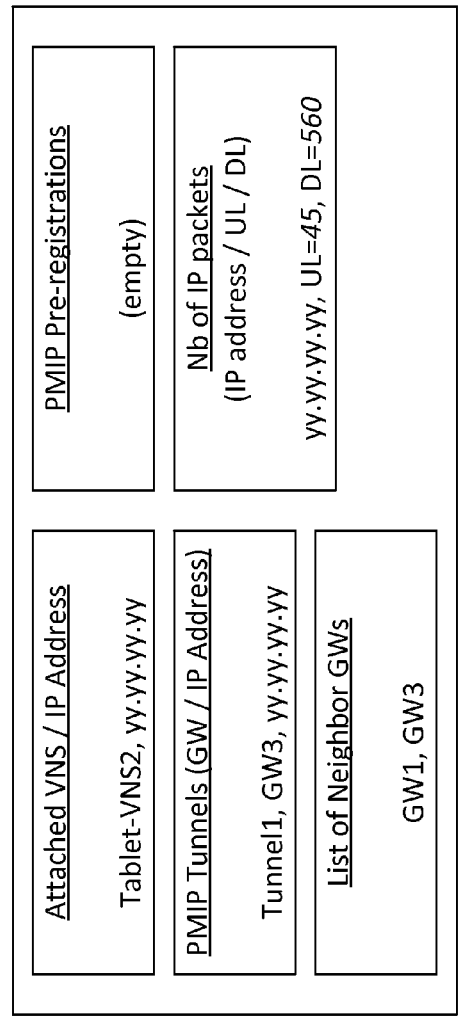
FIG. 3A

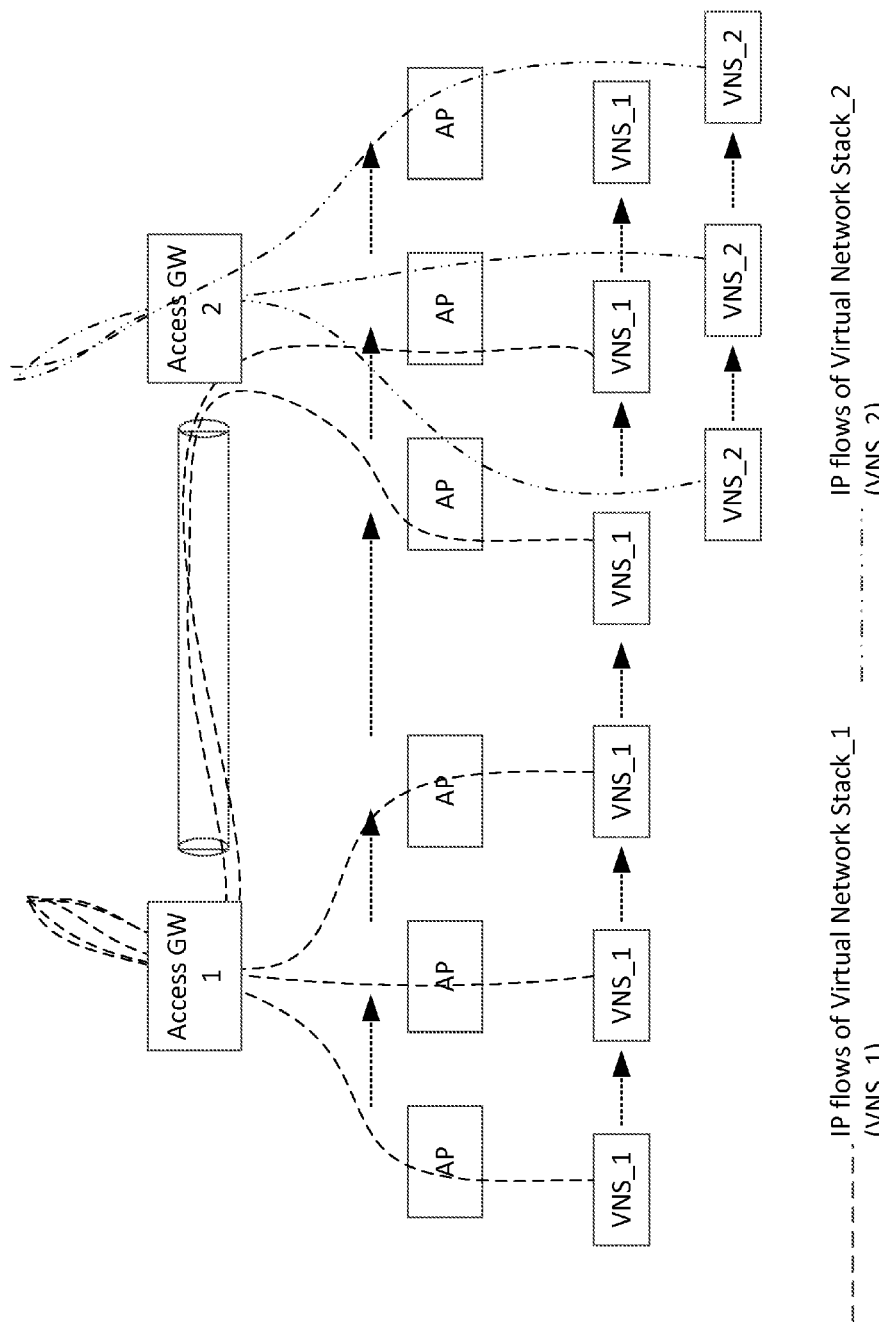

NETWORK STACK VIRTUALIZATION

CROSS-REFERENCE TO RELATED APPLICATIONS

This application is the National Stage Entry under 35 U.S.C. 371 of Patent Cooperation Treaty Application No. PCT/US2013/067460, filed Oct. 30, 2013, which claims the benefit of U.S. Provisional Patent Application No. 61/723,360, titled "Network Stack Virtualization", filed Nov. 7, 2012, the entire contents of both of which being hereby incorporated by reference as if fully set forth herein, for all purposes.

BACKGROUND

Approaches to providing Internet Protocol (IP) connectivity to one or more applications at a terminal, and in particular a mobile terminal, may employ a one-size fits all approach. For example, a scenario may involve a single IP address which may be used by one or more applications operating on the mobile terminal. The totality of IP packets generated at a terminal may be treated as a single batch of IP packets transmitted or received through a single IP pipe. If mobile IP techniques (such as MIP or PMIP) are used, some or all data may be sent through the same mobility anchor node—perhaps effectively through the same mobile networks.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate "network stack virtualization" which may be virtualization of a portion of the communication stack, such as the protocol stack. In some embodiments, multiple functionally of independent copies of the protocol stack may be simultaneously running on the terminal and serving the needs of different applications. This may allow independent operation from the application point of view, including connectivity to different networks with different identities, etc. Embodiments contemplate that any number of such virtual network stacks can be instantiated, perhaps depending on the needs of active application.

Embodiments contemplate the presentation of multiple allocated internet protocol (IP) addresses with enough information to enable an intelligent source IP address selection on the WTRU. The WTRU may be able to select the best IP address depending on which application may be started.

Embodiments contemplate a wireless transmit/receive unit (WTRU). The WTRU may be in communication with a wireless communication network. The WTRU may comprise a processor. The process may be configured, at least in part, to create a first virtual network stack (VNS). The processor may also be configured to obtain a first internet protocol (IP) address from a first node. The processor may also be configured to associate the first IP address with the first VNS. The processor may also be configured to associate a first interface with the first VNS. Further, the processor may be configured to initiate a first application on the first VNS. Also, the processor may be configured to initiate a first IP flow between the WTRU and the first node via the first VNS. The first IP flow may correspond to the first application.

Embodiments contemplate one or more technique that may be performed by one or more nodes of a wireless communication system. The one or more nodes may include a wireless transmit/receive unit (WTRU), a first node, and a second node. Techniques may comprise creating a first virtual network stack (VNS) on the WTRU. Techniques may also comprise obtaining a first internet protocol (IP) address from the first node. Also, techniques may comprise associating the first IP address with the first VNS. Techniques may also comprise creating a second VNS on the WTRU. Further, techniques may comprise obtaining a second internet protocol (IP) address from the second node. Techniques may also include associating the second IP address with the second VNS. Techniques may also include initiating a first IP flow between the WTRU and the second node via the second VNS.

Embodiments contemplate a wireless communication system. The system may comprise a wireless transmit/receive unit (WTRU). The WTRU may comprise a first processor. The first processor may be configured at least in part, to create a first virtual network stack (VNS) on the WTRU. The first processor may also be configured to obtain a first internet protocol (IP) address from a first node. Also, the first processor may be configured to associate the first IP address with the first VNS. The system may also include the first node, which may comprise a second processor. The second processor may be configured, at least in part, to conduct a handover of the first VNS to a second node. Also, the first processor may also be configured to create a second VNS on the WTRU. The first processor may be configured to obtain a second internet protocol (IP) address from the second node. The first processor may also be configured to associate the second IP address with the second VNS. The system may include the second node, which may comprise a third processor. The third processor may be configured, at least in part, to initiate a first IP flow between the WTRU and the second node via the second VNS.

BRIEF DESCRIPTION OF THE DRAWINGS

A more detailed understanding may be had from the following description, given by way of example in conjunction with the accompanying drawings wherein:

FIG. 3 and FIG. 3A depict an example block diagram of an attachment to a third gateway node consistent with embodiments;

FIG. 5 is an example block diagram of a virtual network stack handover to an access gateway consistent with embodiments:

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
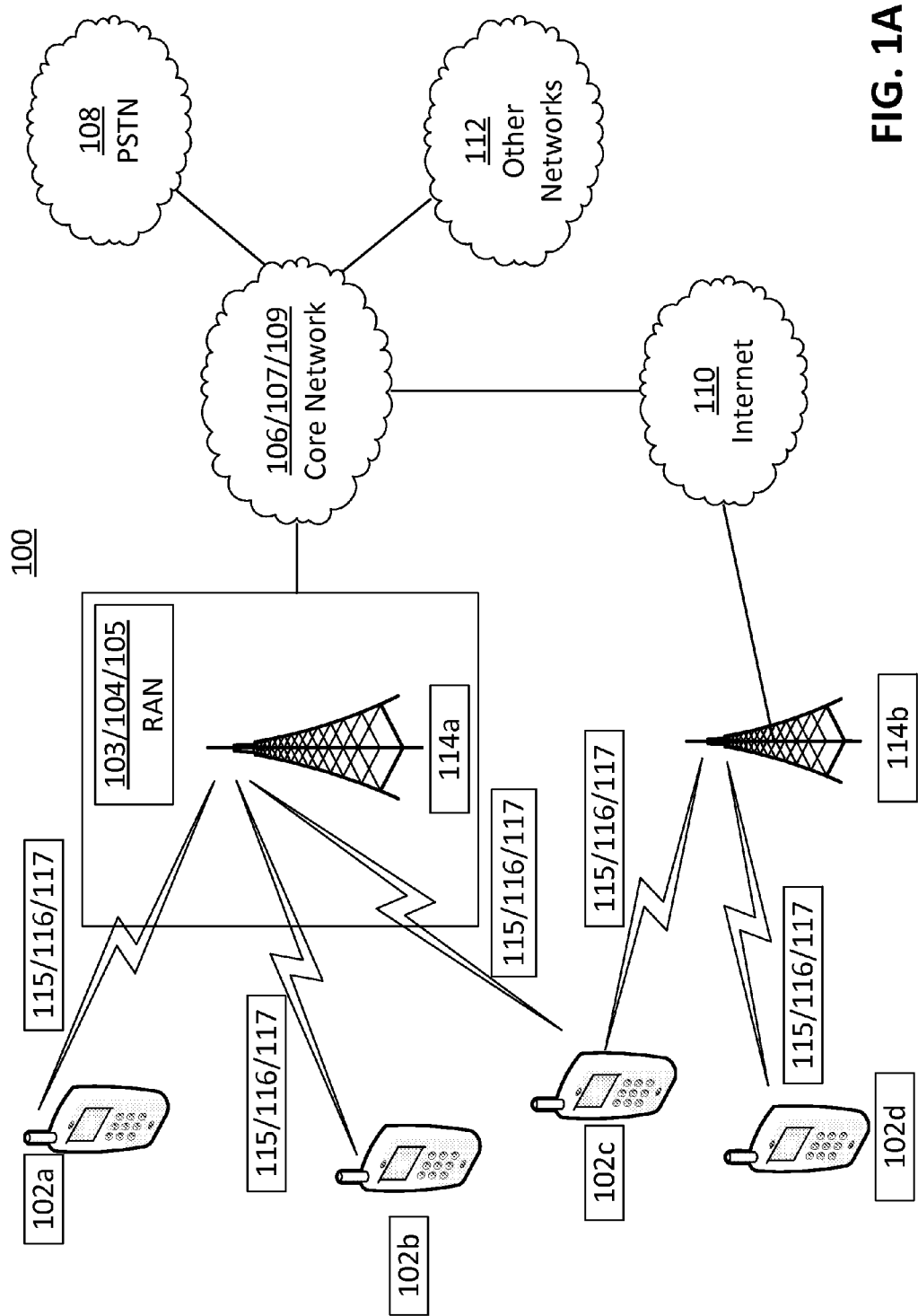
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b. 102c. 102d may be any type of device configured to operate and/or communicate in a wireless environment. By way of example, the WTRUs 102a. 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c. 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a. 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/ 117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c. 102d may implement a radio technology such as IEEE 802.15 to establish a wireless personal area network (WPAN). In yet another embodiment, the base station 114b and the WTRUs 102c. 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a. 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c. 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
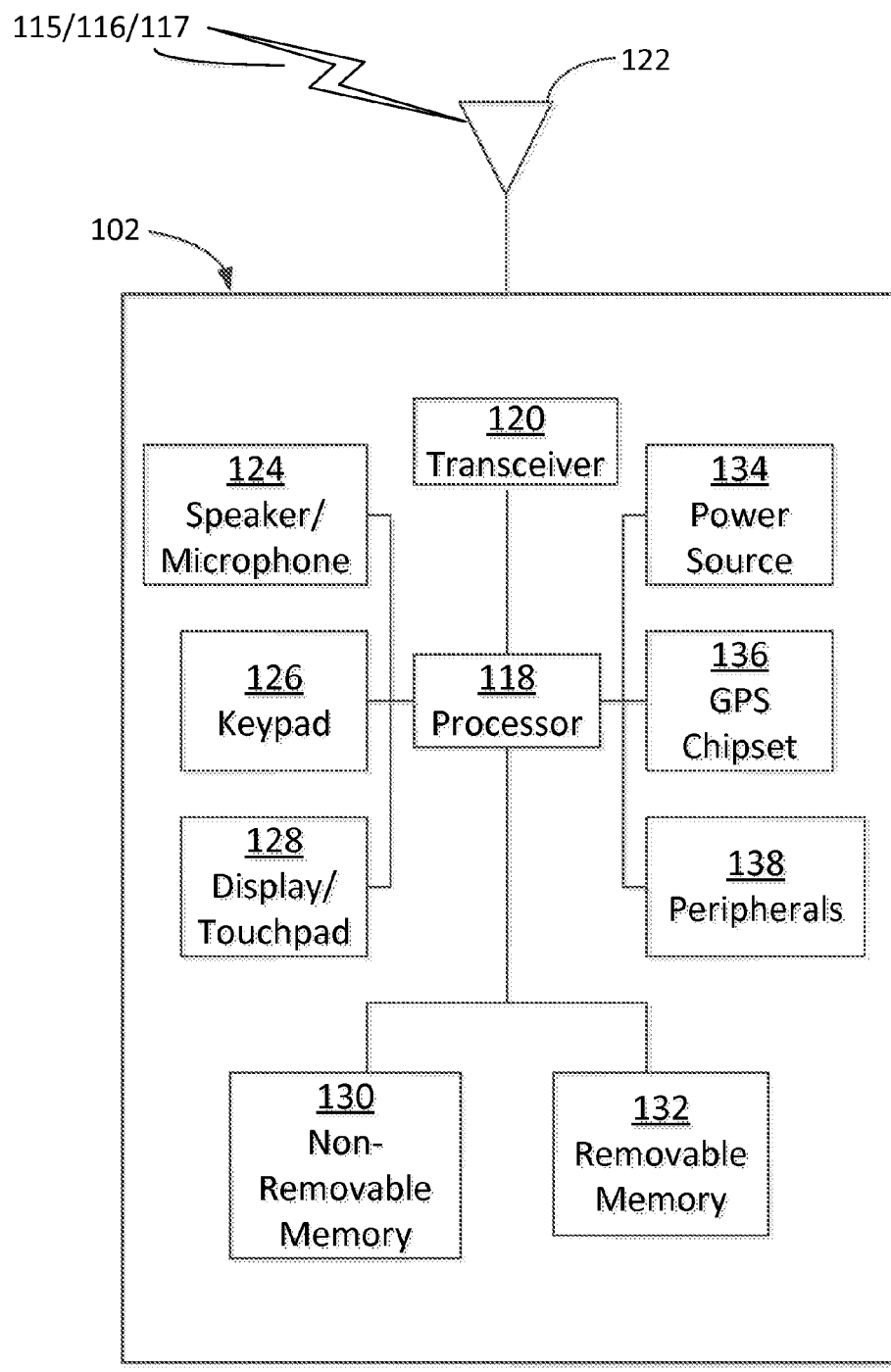
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/ 117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
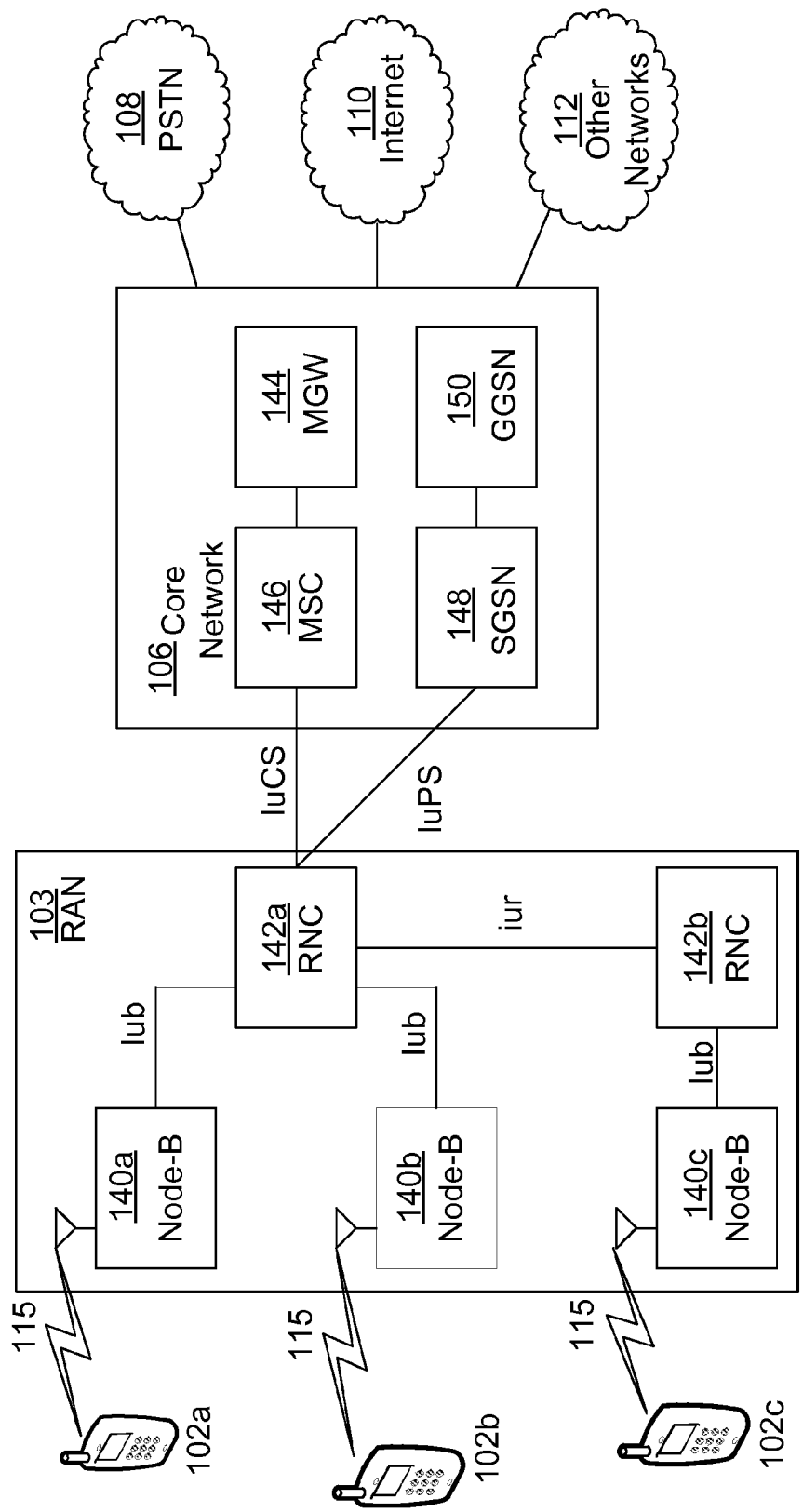
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a. 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
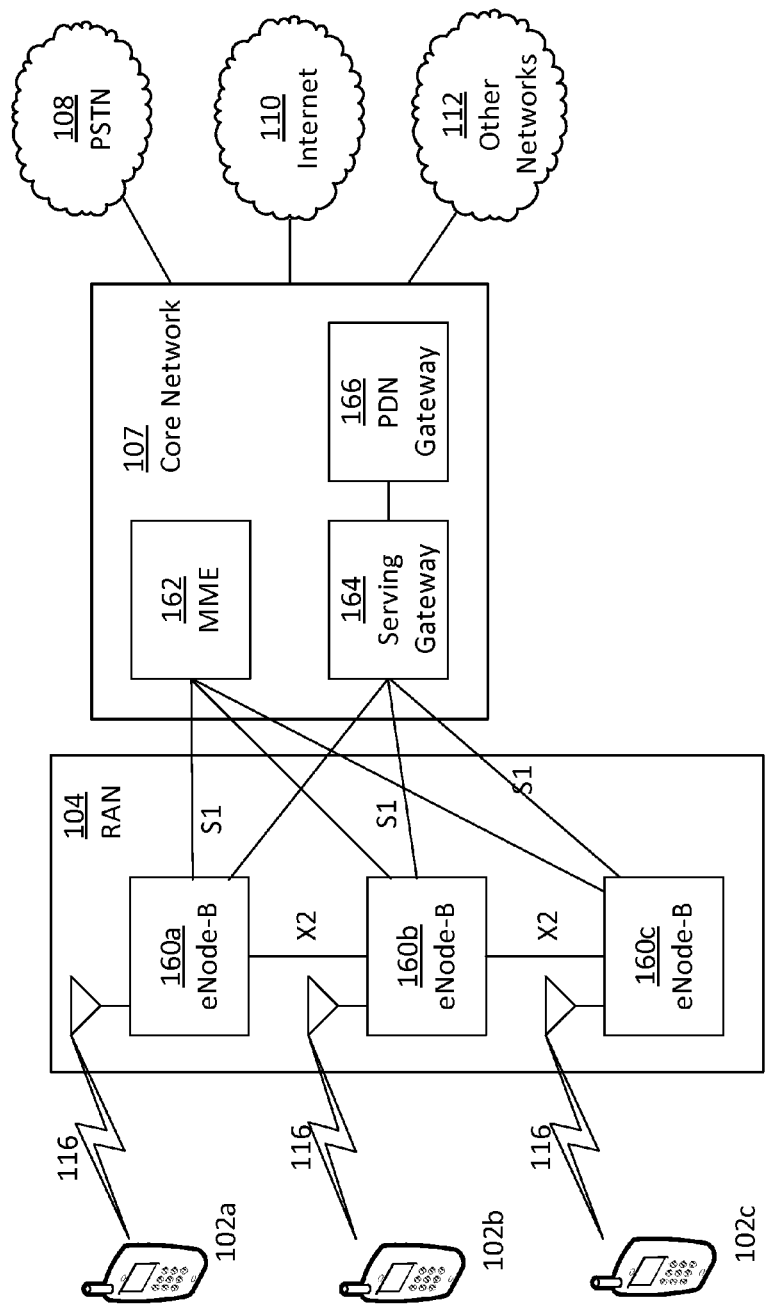
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a. 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
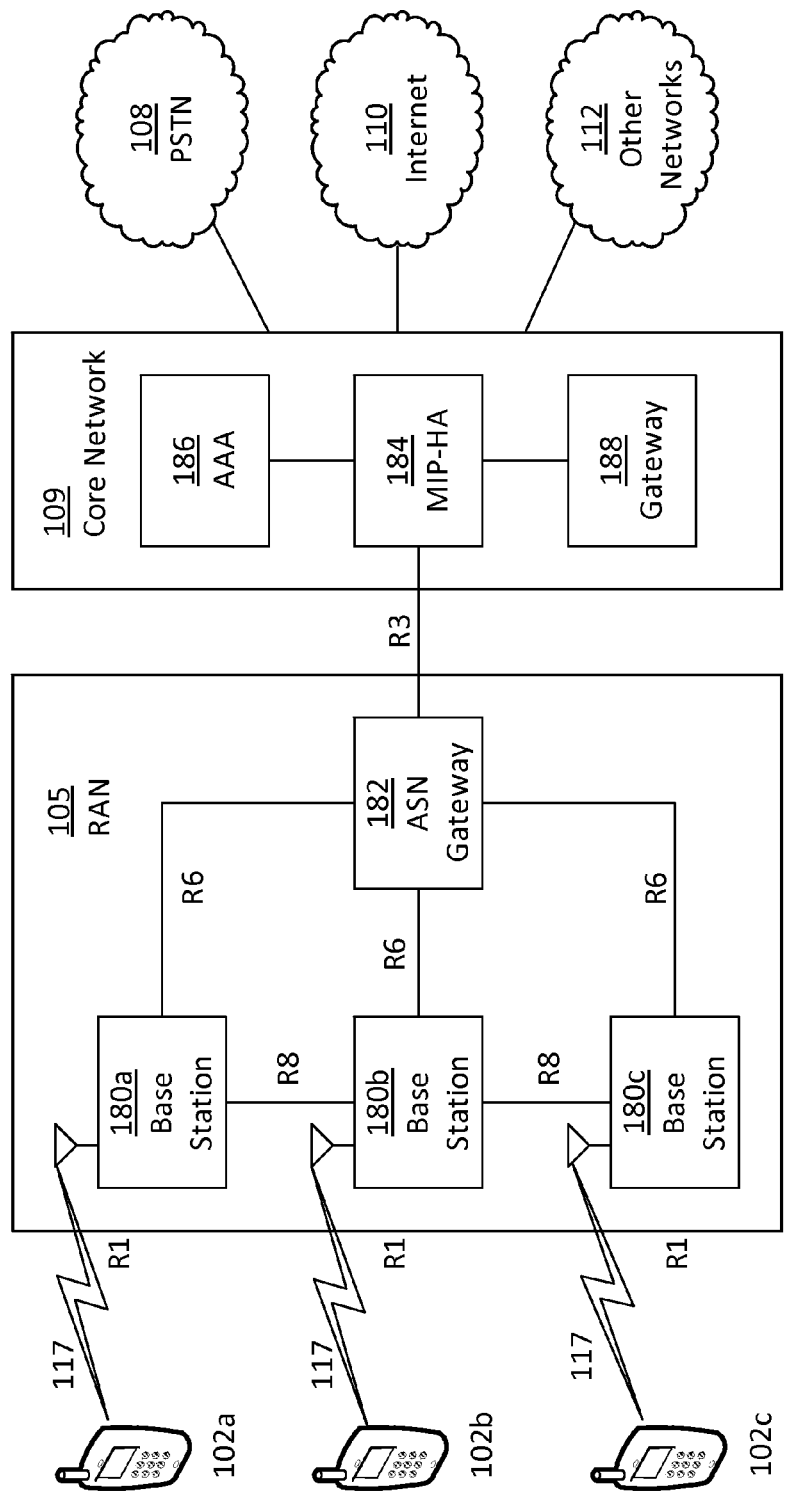
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

Embodiments recognize that in certain cases, multiple IP addresses may be supported in a scenario called multi-homing. Approaches to multi-homing may include: i) the operating system (OS) arbitrarily selects which IP address may be used for a particular application; and/or ii) the application specifies which IP address may be used for its data. Embodiments recognize that both approaches may have limitations. The selection by the OS may not be based on any application-specific parameters; in fact, the OS may use one out of the several available addresses. The application, while aware of its own needs, may know little of the "meaning" of an IP address—e.g., of the types of service associated with it, networks that may be traversed if a particular IP is used, whether mobility is supported, etc. In fact the nearly-universal socket interface network stack API may provide the application with no ability to learn much about the IP stack other than a list of available IP addresses, for example.

Embodiments recognize that application connectivity management has been moving from one IP pipe fits all, to finely-tuned application specific flow management. Examples are IFOM (in IETF and 3GPP), ISRP policies in ANDSF and the fact that evolving architectures (e.g. DMM and mobility support between L-GWs) may be flow-specific. One or more of these techniques may rely on pre-existing mobility solutions: e.g. MIP, PMIP to support HOs, IFOM, DMM and possibly IUT in the future.

Embodiments recognize distributed mobility management (DMM) may be based on the premise that mobility entities (e.g. anchor nodes) come closer to the UE (user equipment or wireless transmit/receive unit (WTRU)) and the UE/WTRU can access a different one as it moves. Central anchoring in PMIPv6 or MIPv6 is no longer there. DMM may enable an efficient data path by anchoring the WTRU to the closest anchor node. DMM may introduce the possibility for a WTRU, using a single interface, to handover between access GWs (also implementing anchoring functionality). Also, DMM may introduce the configuration of multiple IP addresses onto a single interface on the WTRU. These IP addresses may be obtained from a single operator or different operators. Using DMM, a WTRU may handover between D-GWs and maintain connectivity for existing flows (using different IP addresses) while new (or fresh) flows get anchored at the current anchor node. An efficient data path may thus be obtained for new flows. The DMM may create tunnels between the anchor nodes, enabling session continuity, for example to obtain aforementioned behavior. The anchor nodes IP address in addition to the WTRU's allocated IP addresses may be made available to the D-GWs using e.g. a database in the network (e.g. HSS). Other mechanisms to obtain this information may also be used.

Embodiments recognize WTRU mobility support between L-GWs. WTRU mobility between L-GWs may be based on DMM. It may be enabled by establishing a tunnel between the source L-GW and the target L-GW (network-based solution). The tunnel may also be created between the WTRU and the source L-GW (client-based solution). Embodiments contemplate one or more network-based solutions. A first solution may save some information regarding the L-GW where the WTRU may be connected. This information may be later used by the target L-GW to create a tunnel toward this source L-GW. The needed information may be saved in the network and may be accessed by the anchor nodes and the WTRU. A second network-based solution may use a pre-registration mechanism, instead of a database in the network, to directly save the required information to create a tunnel onto the possible target L-GWs. A third solution may be client-based. Using this solution, the WTRU mobility between the L-GWs may be enabled by the creation of a tunnel between the WTRU and the source L-GW. The data received by the source L-GW may be re-directed to the current L-GW and then to the WTRU via the tunnel, for example.

For purposes of explanation, and not by way of limitation, embodiments contemplate that following acronyms (as used herein and/or the figures):
ANDSF Access Network Discovery and Selection Function
AP Access Point (e.g., WiFi and/or 802.11 systems)
BWM Bandwidth Management
CoA Care-of-Address
DMM Distributed Mobility Management
DSMIP Dual Stack MIP
GTP GPRS Tunneling Protocol
GW Gateway
D-GW Distributed Gateway
L-GW Local Gateway
HO Handover
HoA Home Address
HSS Home Subscriber Server
IFOM IP Flow Mobility
ISRP Inter-System Routing Policy
IUT Inter-Unit Transfer
LMA Local Mobility Anchor
MAG Media Access Gateway
MIP Mobile IP Protocol
NB-IFOM Network-Based IFOM
NSV Network Stack Virtualization
PBA Proxy Binding Acknowledgement
PBU Proxy Binding Update
PGW Packet Gateway
PMIP Proxy MIP
SGW Serving Gateway
RAT Radio Access Technology
UE User Equipment (or a Wireless Transmit/Receive Unit)
VNS Virtual Network Stack Notwithstanding the per-flow processing trends and the technologies that have emerged to support these, much of the communication paradigm from the application's point of view may continue to rely on a single protocol stack approach. Specifically, applications may continue to expect to communicate with a single protocol stack through a simple socket interface. Embodiments contemplate one or more rationale for maintaining the status quo. Application developers should not have to worry about the aspects of communication networks which they may not be technically prepared to address—and which may not be known when the application is created. Attempting to address network behavior in the application may result in overly complex applications that often duplicate functions that are—and perhaps should be—performed in the protocol stack.

Furthermore, mobility anchors may be still viewed as single points rather than picking the right one for the right application. For example, a single anchor point may be used in the macro network architecture. Another example is the usage of multiple anchor points in the DMM architecture with the currently connected anchor node selected by default for some or all new (or fresh) flows that are started.

Embodiments contemplate one or more techniques to provide one or more, or each, application the "look and feel" of a single protocol stack, perhaps while providing differentiated service and/or IP connectivity to one or more, or each, application within the protocol stack.

Embodiments contemplate that an aspect of VNS may be the ability to address the "network identity" issue associated with IP networks and to provide a solution to the issues associated therewith. To date, the notion of a "network identity" has been left unclear in IP network—a fact that is widely recognized as one of the issues with the IP network architecture. In fact, the "network identity" may be tied to other identifiers—either the higher level user or device identity (via user log on, SIM credentials, application-based credentials, etc.) or to the network "location"—e.g., the IP address.

In IP networks, the location/identity issue, embodiments recognize several previous efforts to enable formal separation of these, such as the HIP and LISP work in IETF. However, such efforts may not be fully compatible with the present IP protocol and the associated protocol suite (routing, etc.) and may therefore require world-wide replacement of IP for adoption. Likewise, from a higher-layer/application point of view, embodiments recognize there may be no way to tie network identity (and thus the ability to use a network connection) to a specific application. In some embodiments, this may mean that if application-based credentials are used for network access, the resulting connection may actually be available for use and/or abuse by some or all other applications on the device. For example, if a particular application opens a connection to a WiFi HotSpot for its own use, the resulting connection, including IP addresses allocated to the device, may actually be available to use by any application on the device. Embodiments recognize that application-based packet inspection filters have been used, but these are expensive and limited in their effectiveness—and differ from the contemplated embodiments herein.

Embodiments contemplate the concept of "network stack virtualization"—which in some embodiments may be a relatively mild virtualization of just the OS portion of the communication stack. Unlike full "mobile terminal virtualization", which may involve multiple functionally independent copies of a full mobile terminal SW coexisting on the same HW, embodiments contemplate the virtualization of the protocol stack, and in some embodiments perhaps only the protocol stack. In one or more embodiments, multiple functionally independent copies of the protocol stack may be simultaneously running on the terminal and/or serving the needs of different applications. This may allow partial or completely independent operation from the application point of view, including connectivity to different networks with different identities, etc. Any number of such virtual network stacks can be instantiated depending on the needs of active application.

Embodiments contemplate techniques to address several issues related with mapping "virtually independent" functionality to the same physical resource. Embodiments contemplate that it may be useful to bind different IP addresses to the same physical modems ("network interface card" (NICs) in the operating system terminology), while at the same time allowing one or more, or each, of these network stacks to utilize one or more, or each, one of these interfaces. In other words, the relationship between IP addresses and NICs may be many-to-many—instead of other scenarios where it may be one-to-one.

Regarding the usage of multiple network stacks, embodiments contemplate that it may be useful to present the multiple allocated IP addresses with enough information to enable an intelligent source IP address selection on the WTRU. The WTRU may (and in some embodiments perhaps must) be able to select the best IP address depending on which application is started.

Embodiments also contemplate that it may be useful to release the virtual network stacks when they may not be needed or useful anymore to not needlessly take hold of resources on the WTRU and/or in the network. More specifically, memory may be used on the WTRU to maintain the virtual network stack status. On the network side, control plane traffic may be unnecessarily generated to maintain session continuity with the corresponding anchor node, while holding the IP address allocated to the virtual network stack and preventing it to be re-assigned to another WTRU. Embodiments also contemplate that it may be useful if the virtual network stacks may be uniquely identified in the network and, in some circumstances, it may be useful to be able to determine if these stacks are running or not on the same device. Embodiments also contemplate that DMM and other existing technologies can be put to use to solve these issues and deliver contemplated functionality.

As described herein, embodiments contemplate the usefulness of network stack virtualization (VNS). On the WTRU, network stack virtualization may enable a clear partition of available connections/interface/IP addresses to which applications can bind. Additionally, in the network (from the anchor node's perspective), network stack virtualization may facilitate the support of BWM features by disassociating the IP addresses from the WTRU. For example, HO or IFOM may be performed from a VNS to another one. If the two VNSs are on the same WTRU then the usual behavior may be obtained. If the VNSs are on different WTRUs then a previously undefined feature may be enabled, in this case for example—inter-WTRU transfer. Thus, VNS may allow the combination of various features such as handover, flow mobility and/or inter-WTRU transfer under a single umbrella.

Using the virtual network stack concept, the support of mobility and BWM features may be simplified. For a virtual network stack, supporting a simple HO (from an interface to another one), a flow transfer from an interface to another or a flow transfer to another WTRU, the same handling may be useful. The anchor node may (or in some embodiments must) be configured to redirect the data to the VNS or to another anchor node/GW while the VNS may be prepared to receive packets destined to an IP address that may be different than the one currently configured on the VNS and be able to respond to these packets using this same IP address as the source IP address. And some or all of the aforementioned may be done seamlessly to the user.

Embodiments contemplate that flows may be transferred from a VNS to another VNS. Pushing this virtual network stack concept further and to show that network stack virtualization may enable the support of other features, network stack virtualization may be used to enable the support of inter-unit transfer (IUT): the VNSs may be created from different physical devices. Considering the redirection of data between the WTRUs, using VNSs may enable the support of IUT in the same way as IFOM between two VNSs simultaneously connected to the network and anchored at the same or different anchor nodes. One or more embodiments may assume that specific steps for target WTRU preparation may be handled within the control part of IUT and may not be affecting the data redirection mechanism.

Flow transfer between VNSs from different physical devices may be illustrated in the described techniques and Figures herein.

One or more embodiments contemplate the concept of Network Stack Virtualization Alternately or additionally, one or more embodiments contemplate how VNS can be used to address the "network identity" issue and one or more techniques to address that issue. Alternately or additionally, one or more embodiments contemplate an alternative solution to DMM. Alternatively or additionally, one or more embodiments contemplate enhanced mobility and bandwidth management support. Alternatively or additionally, one or more embodiments contemplate the enablement of clear partitioning of available connections/IP addresses on the WTRU. Alternatively or additionally, one or more embodiments contemplate virtual network stack management.

One or more embodiments contemplate network stack virtualization. In some embodiments, perhaps using the current definition of network-based (e.g. PMIP or GTP) or client-based (e.g. DSMIP) mobile network, the WTRU may obtain an IP address from the anchor node, e.g. LMA or HA, and may get anchored at this anchor node. Considering that a WTRU may use multiple IP addresses simultaneously and that mobility and BWM features may be based on IP addresses/interfaces, these features may be simplified by associating a WTRU with one IP address/interface (and in some embodiments perhaps only one IP address/interface). This may enable the network stack virtualization.

In one or more embodiments, a virtual network stack (VNS) may be created on the WTRU sometimes, or each time, a WTRU connects to a network and obtains an IP address. Multiple VNSs may be created on a WTRU. Flows started on the WTRU may be associated to a specific VNS. A WTRU may not be anchored to a specific GW; it is the VNSs and their flows that may get anchored to a specific GW. A VNS for which continuity is maintained via e.g. PMIP tunneling may be deleted when no more flows may be associated to it. A VNS identifier may be unique and may be created from the unique WTRU identifier. It may be possible for the GW to identify the VNSs that are located on the same WTRU.

A virtual Network Stack (VNS) may represent an IP address/interface for a specific WTRU. For example, a WTRU being configured with two different IP addresses may be seen as two VNSs. Regular BWM features may be used between these two VNS.

Moreover, network stack virtualization may be described by one or more of the following:
  A Virtual Network Stack (VNS) may be created on a WTRU when an IP address from an anchor node (e.g. GWa) may be obtained;
  Network stack virtualization may be done at the connectivity level, e.g. IP stack. Some layers in the WTRU may be shared among the VNSs, e.g. the same OS may be used by all VNSs;
  This Virtual Network Stack, and some or all IP flows using this IP address, may be anchored at this anchor node (e.g. GWa);
  A Virtual Network Stack may handle multiple IP flows; and/or
  In a DMM-enabled network, perhaps when a WTRU does handover to another anchor node (e.g. GWb), among other scenarios, the existing Virtual Network Stack (e.g. VNS_1) may remain registered with its anchor (GWa); a new Virtual Network Stack (e.g. VNS_2) may be created and may get anchored at the newly connected anchor node (GWb) that allocates an IP address to the Virtual Network Stack (VNS_2)
  In such scenarios, DMM capability may be used in the network and on the WTRU, perhaps to provide session continuity with GWa;

Network stack virtualization may be also described by one or more of the following:
  A new VNS may be created and may get anchored at the anchor node which may have provided the IP address, perhaps when a WTRU may connect to the network using another interface and may obtain another IP address. This may be the same anchor node as for the other WTRU's interfaces or a different anchor node;
  The VNSs may be seen as independent of each other (e.g. they have their own anchor, own IP flows, etc.) however, it's still possible to associate them with the WTRU using the VNS's identity (as defined below). They may be considered as peers, e.g. flows may be moved between each other
    The VNSs don't have to be associated to the same WTRU to be peers. Various association methods may be used, e.g. groups configured for each VNS, preregistered VNS peers or configured via policies, peer discovery/negotiation, etc.;
  In the case where different interfaces are used to access the network, mobility and bandwidth management features (e.g. IFOM) may be used between the VNSs associated to different interfaces;
  A WTRU may be associated with multiple VNSs anchored at the same or different anchor nodes; and/or
  A VNS may be deleted when no more IP flows are used by this VNS and/or the VNS may not be directly connected to its anchor node.

Various examples of mobility and bandwidth management features handling are illustrated in the embodiments and Figures described herein.

Embodiments contemplate network connectivity management using VNS. From a network location/identity perspective, one or more embodiments contemplate alternatives that does not require introduction of new protocols. From the point of view of application specific connectivity, one or more embodiments contemplate the ability to tie a VNS to a specific set of applications—and keep it restricted from use by other application.

Embodiments contemplate one or more example techniques. In some embodiments, a WTRU (e.g. the connection manager on the WTRU) may decide that it may be useful for a new (e.g., fresh or different) VNS stack to be created. This can be a result of several factors, including one or more of:
  New application requesting connection and none of the existing VNS are appropriate to support this application
  Request from the network to create a new VNS; and/or
  Device encountered a new environmental condition (e.g. new networks detected) which call for a new VNS as per policy.

In some embodiments, the new (e.g., fresh or different) VNS may be associated with one more permissions and/or a specific permission list which may include one or more of:
  Lists of application permitted and/or prohibited from using it;
  Lists of access and IP connectivity networks the VNS is allowed—or prohibited—from using, as well as preference list; and/or
  Other policies concerning QoS, mobility, security, etc.

The WTRU may initiate a network connection procedure to the network(s) that the VNS may be provided connectivity to. The connection procedure may use various authentication credentials, including for example one or more of:
SIM/USIM/UICC at the WTRU;
Network-specific user or device credentials; and/or
Bootstrapping to $3^{rd}$ party identity service with a protocol such as OpenID.

Perhaps upon a successful connection, among other scenarios, the network(s) connected may provide the WTRU with a new IP address(es) associated with this VNS—one IP per VNS for example, but multiple may be used. In some embodiments, these IP addresses may be distinct from any other IP addresses the WTRU may have—even if they come from the same network.

As such, the network may continue using the IP address as a "network id" as well as location; and/or
The network may create a separate "network identifier" associated with a given VNS for management purposes.

In some embodiments, perhaps by associating one or more, or each, VNS with a separate identity—and a separate set of IP addresses, among other scenarios, an operation may be enabled that might be difficult to enable otherwise. For example, the network can:
Provide differentiated QoS, mobility, etc. support for different VNSs; and/or
Revoke a particular VNS connection—e.g. cease communication for one or more applications connected using at least one particular VNS, without affecting applications connected to the same network via other VNSs on the WTRU.

In some embodiments, perhaps when a WTRU establishes a new VNS connection with a network, it may already have a connection with that network using the same or a different set of credentials. In such scenarios, the WTRU may have multiple connections to the same network—with the different credentials or sometimes even with the same credentials. Presently, the network may reject such multiple connection attempts—perhaps especially if the same identity credentials are being used to establish it. With VNS, the networks may treat each such connection as a new connection. To avoid security issues (e.g. replay attacks, Sybil attacks, etc.), among other rationale, additional signaling may be added to authentication requests to indicate that a new VNS is being established using credentials for which a WTRU-network connection may already exist, for example.

One or more embodiments contemplate mobility support with a virtualized network stack and DMM. The following example scenario illustrates in a step-by-step manner what may happen when the WTRU is doing HOs to different DMM-enabled GWs. In the scenario, a video application may be started on the WTRU while this WTRU may be connected to "GW1". Then, while the video is still playing, the WTRU does HO to "GW2" and starts a large file download. Finally, the user may do a HO to "GW3" and then may start using Twitter (for example) while the previous two applications may still be running. In some embodiments, a single interface may be used on the WTRU for that scenario. Also, a neighboring method may be used to advertise the current VNSs that have been created with their IP address and the anchoring node IP address. The neighboring mechanism is described herein. Other mechanisms may be used instead, e.g. using a database in the network like HSS.

The following Figures illustrate the different windows that may appear on the screen of the WTRU and GWs at each step. Some embodiments may assume that a network-based solution (PMIP) may be used. It may be applicable to other network-based solutions as well (e.g. GTP). For a client-based solution (e.g. MIP), the same concept of network stack virtualization may be used as well however, the HO procedure may be handled on the device by the VNSs themselves when a HO may be detected.

Figure 1F:
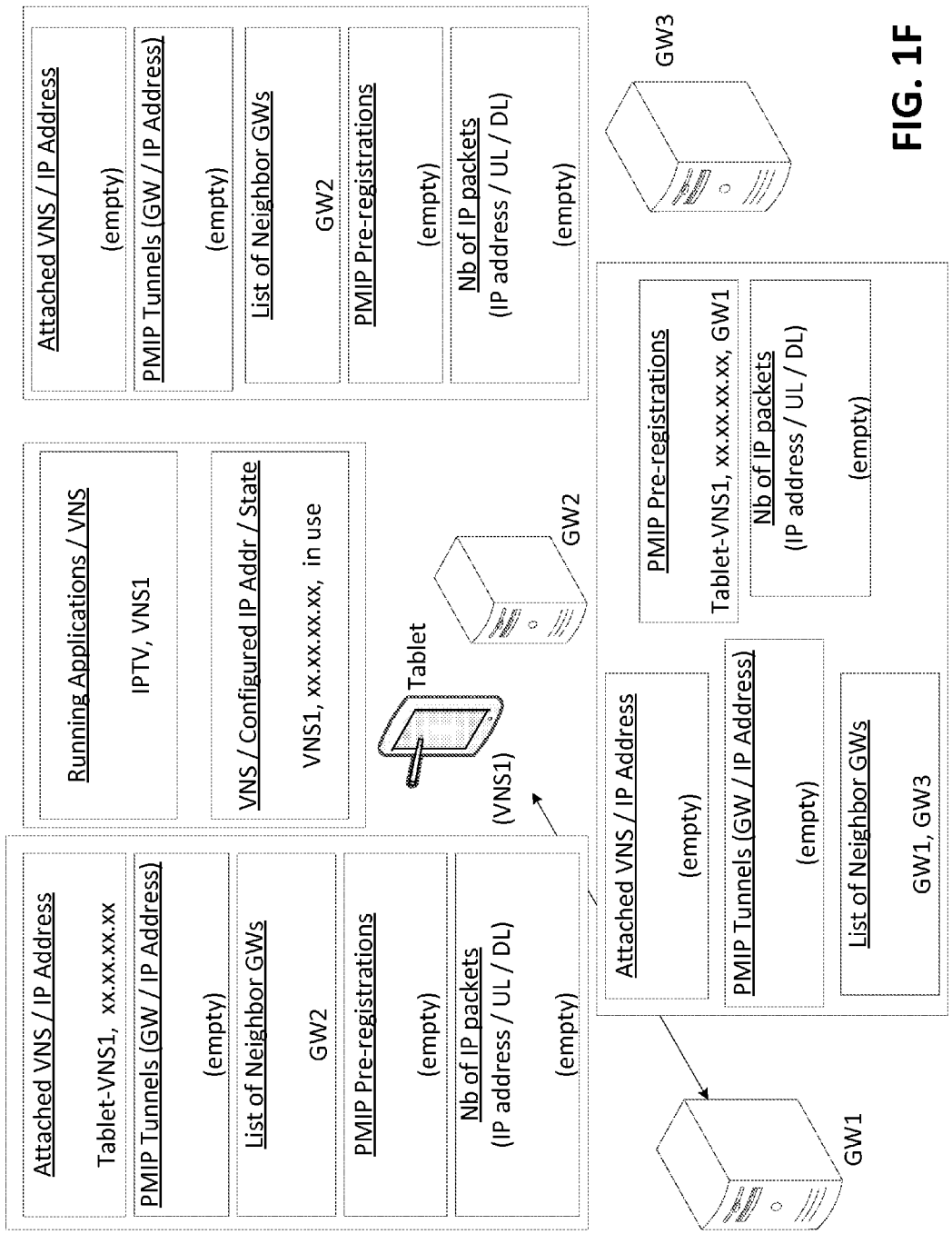
FIG. 1F is an example block diagram of an attachment to a first gateway node consistent with embodiments.

Referring to FIG. 1F, a Virtual Network Stack (VNS1) may be created. A WTRU may attach to GW1 and IP address xx.xx.xx.xx may be obtained and associated to VNS1. GW1 may do a pre-registration with its neighbor GW2. Further, an IPTV application may be started on VNS1.

Figure 2:
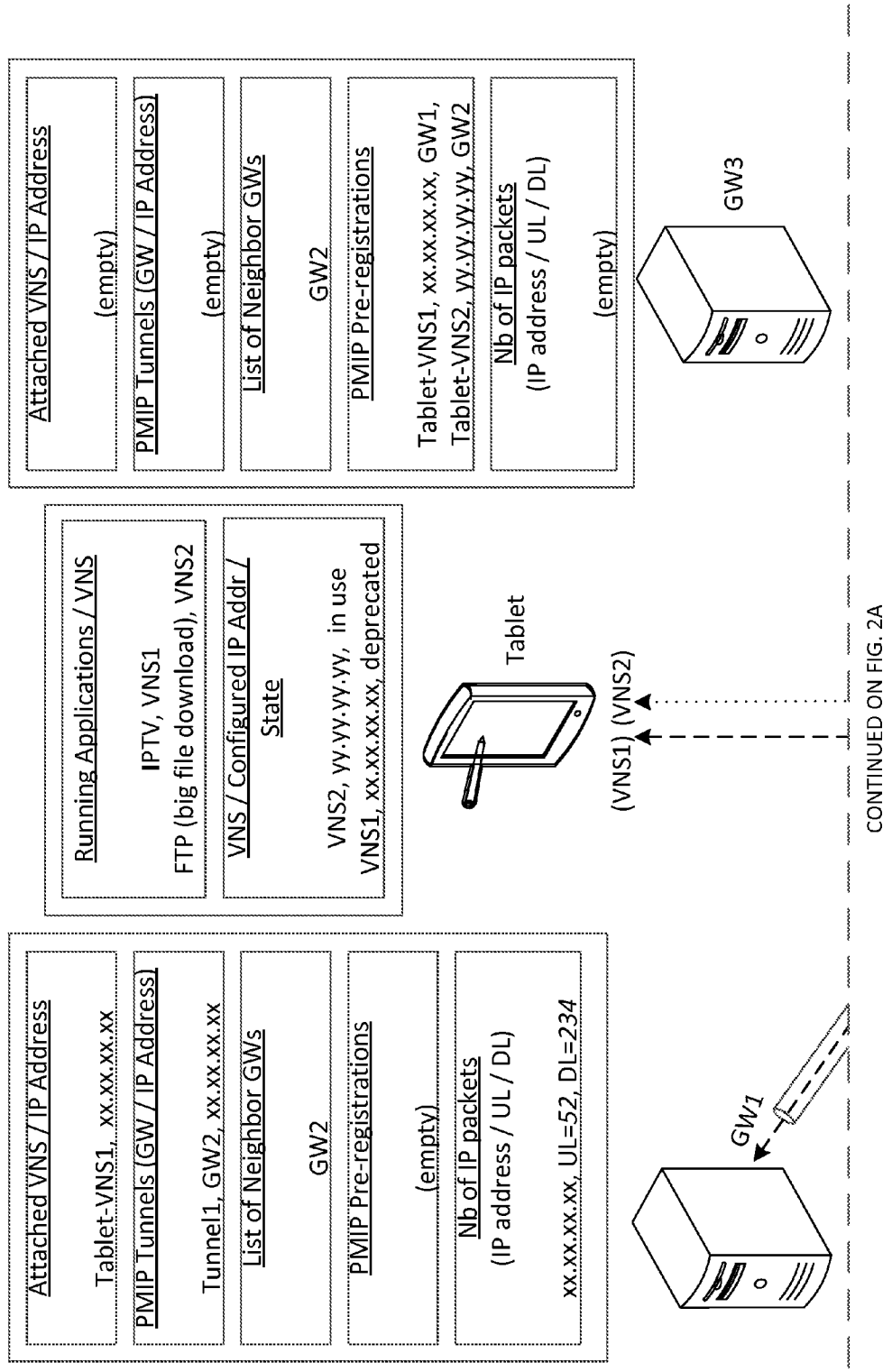
FIG. 2 and FIG. 2A depict an example block diagram of an attachment to a second gateway node consistent with embodiments.
Figure 2A:
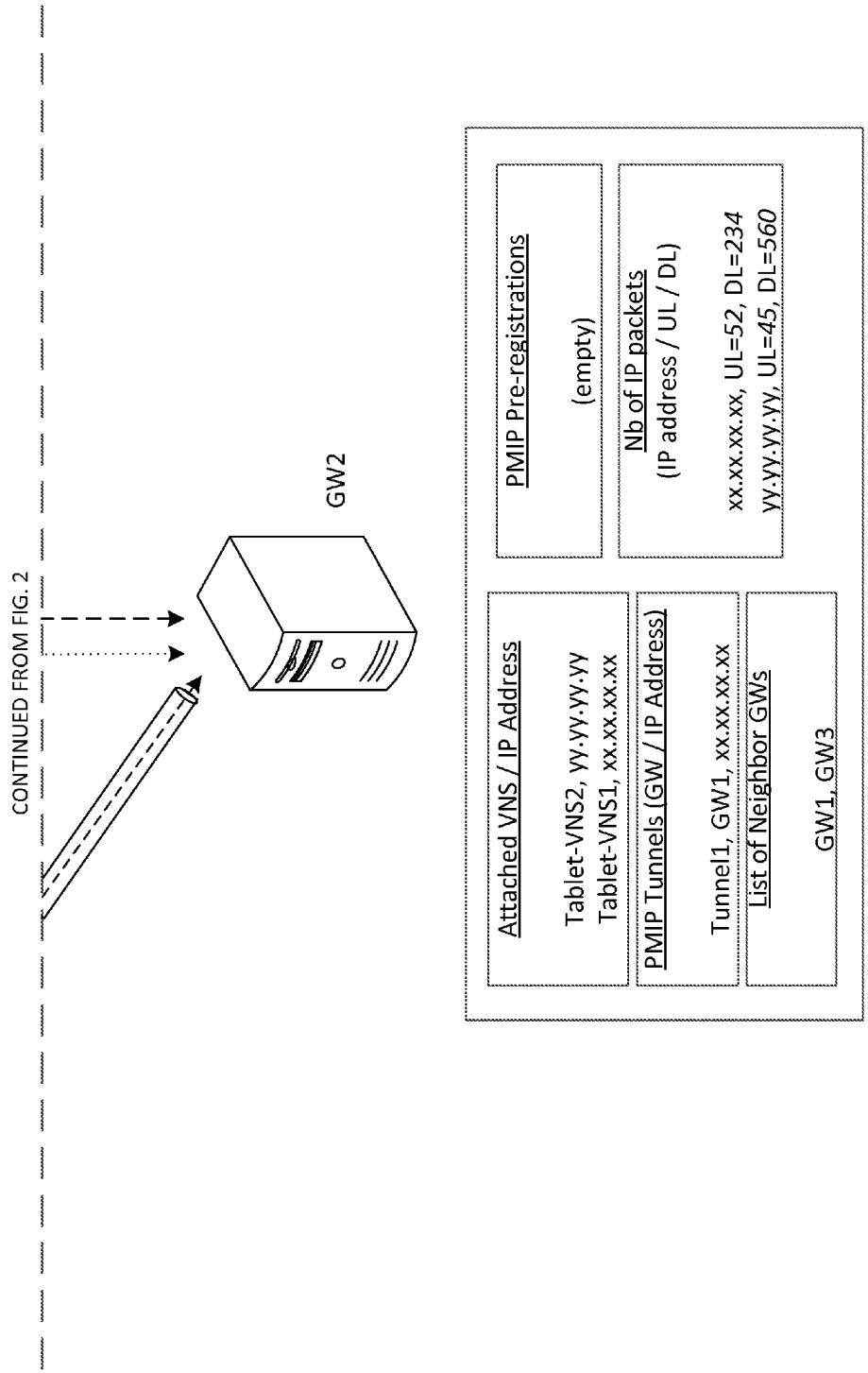

Referring to FIG. 2 and FIG. 2A, the WTRU may do a handover to GW2. GW2 may detect that VNS1 has done a HO thus may consider the HO procedure to be done (e.g. GW2 may establish a tunnel with GW1 to handle VNS1 traffic). A VNS1/IP address xx.xx.xx.xx may be deprecated (e.g., set as not directly connected). Another Virtual Network Stack (VNS2) may be created and an IP address yy.yy.yy.yy may be obtained from GW2 and associated to VNS2. GW2 may pre-register the two existing VNSs with its neighbor GW3. An FTP download may be started on VNS2 using yy.yy.yy.yy. And an IPTV application may still be running on VNS1 using xx.xx.xx.xx.

Figure 3:
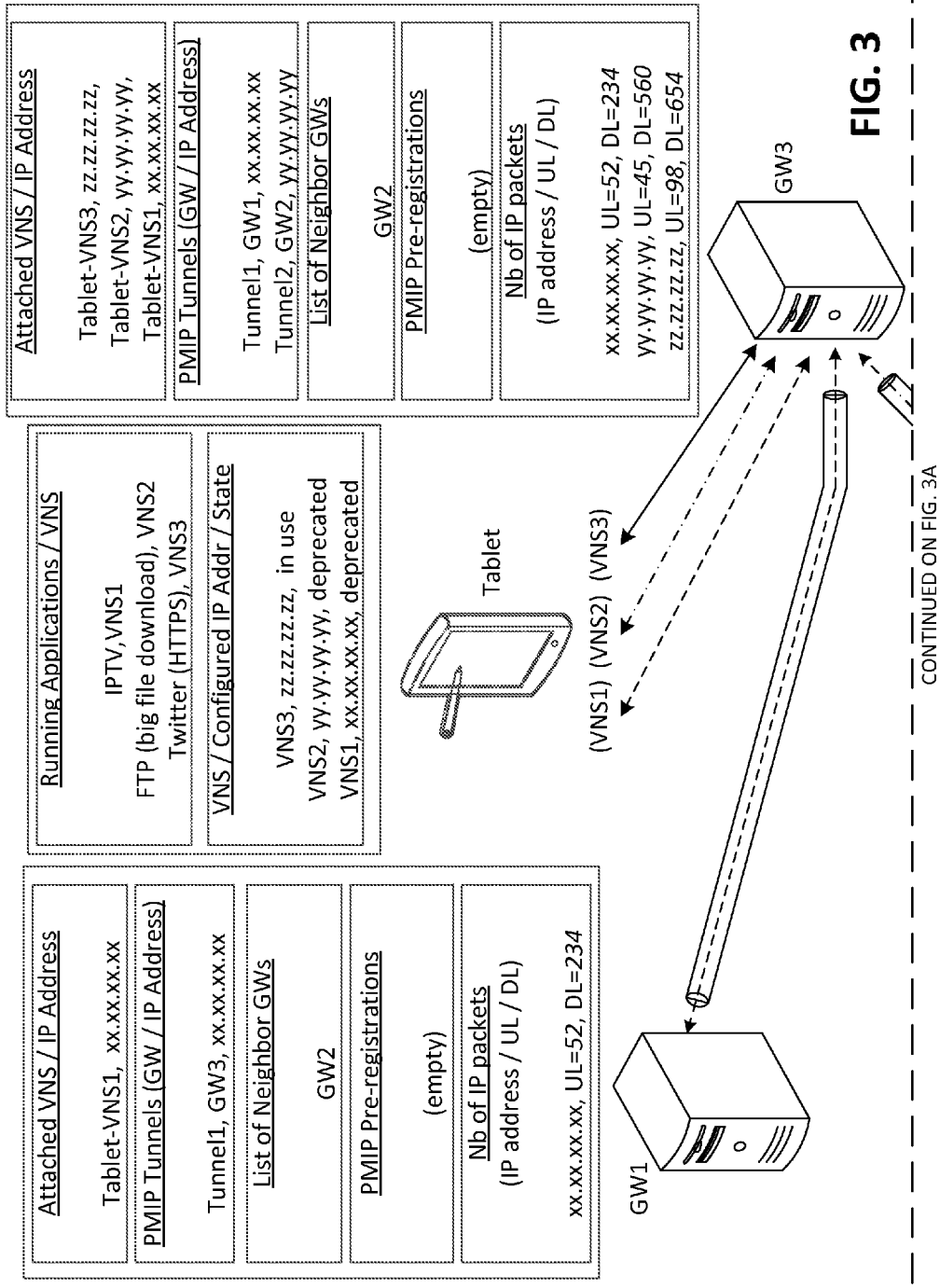

Referring to FIG. 3 and FIG. 3A, the WTRU may do a handover to GW3. GW3 may detect that VNS1 has done a HO thus the HO procedure may be considered to be done (e.g. GW3 may establish a tunnel with GW1 to handle VNS1 traffic). GW3 may detect that VNS2 has done a HO thus the HO procedure may be considered to be done (e.g. GW3 may establish a tunnel with GW2 to handle VNS2 traffic). A third Virtual Network Stack (VNS3) may be created and an IP address zz.zz.zz.zz may be obtained from GW3 and may be associated to VNS3. VNS1/xx.xx.xx.xx and/or VNS2/yy.yy.yy.yy may be deprecated (e.g., set as not directly connected). GW2 may close the tunnel to GW1, perhaps when it notices that the VNS2 may not be connected anymore and/or GW1 may close the tunnel with GW2, perhaps when a tunnel handling IP address xx.xx.xx.xx may be created by GW3 (perhaps depending of which event occurs first). In some embodiments, Twitter, among other applications for example, may be started on VNS3. The FTP download using yy.yy.yy.yy may still be running on VNS2. And an IPTV application may still be running on VNS1 using xx.xx.xx.xx.

Figure 4:
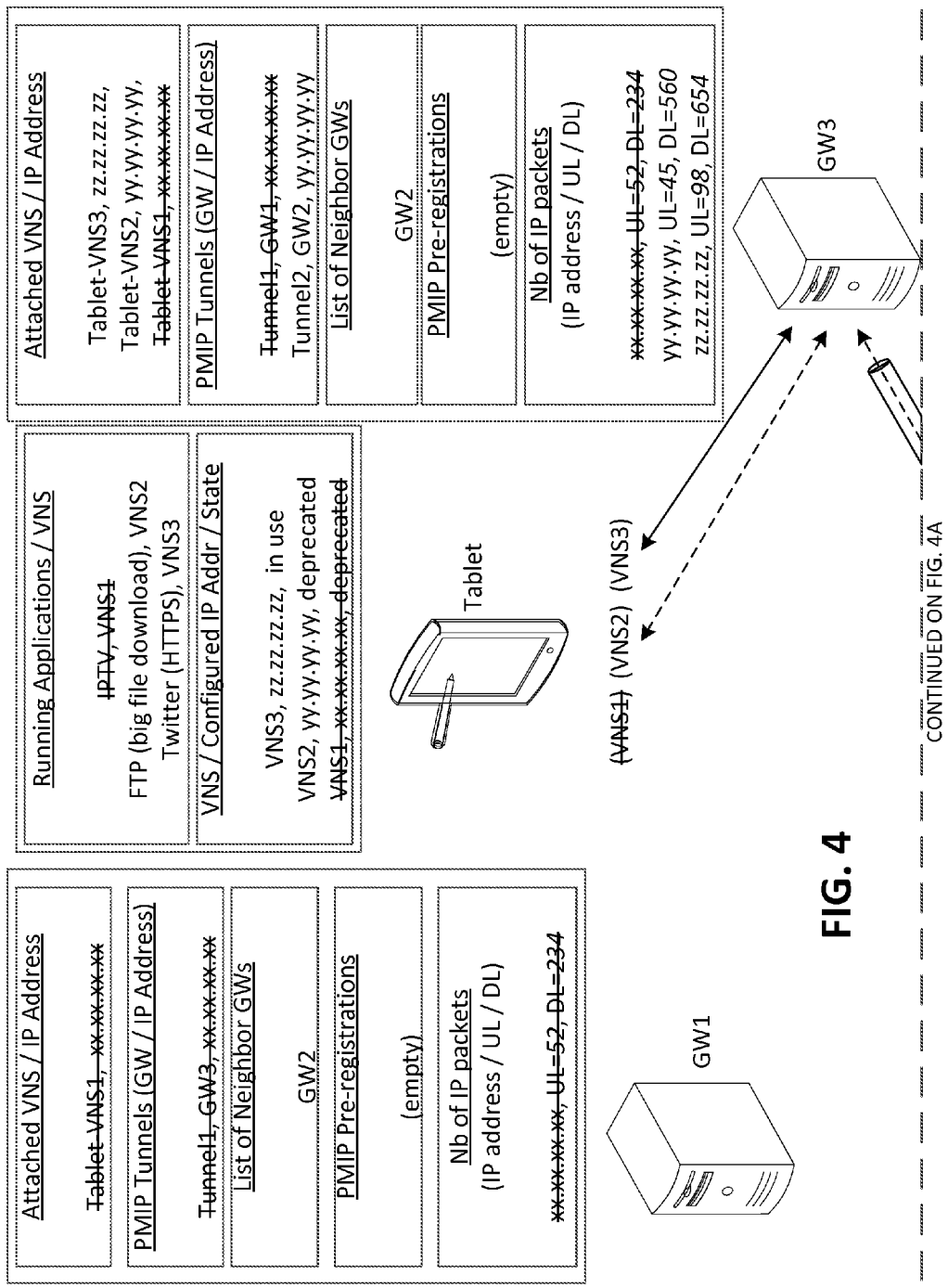
FIG. 4 and FIG. 4A depict an example block diagram of closing an application accessed via the first gateway node consistent with embodiments.
Figure 4A:
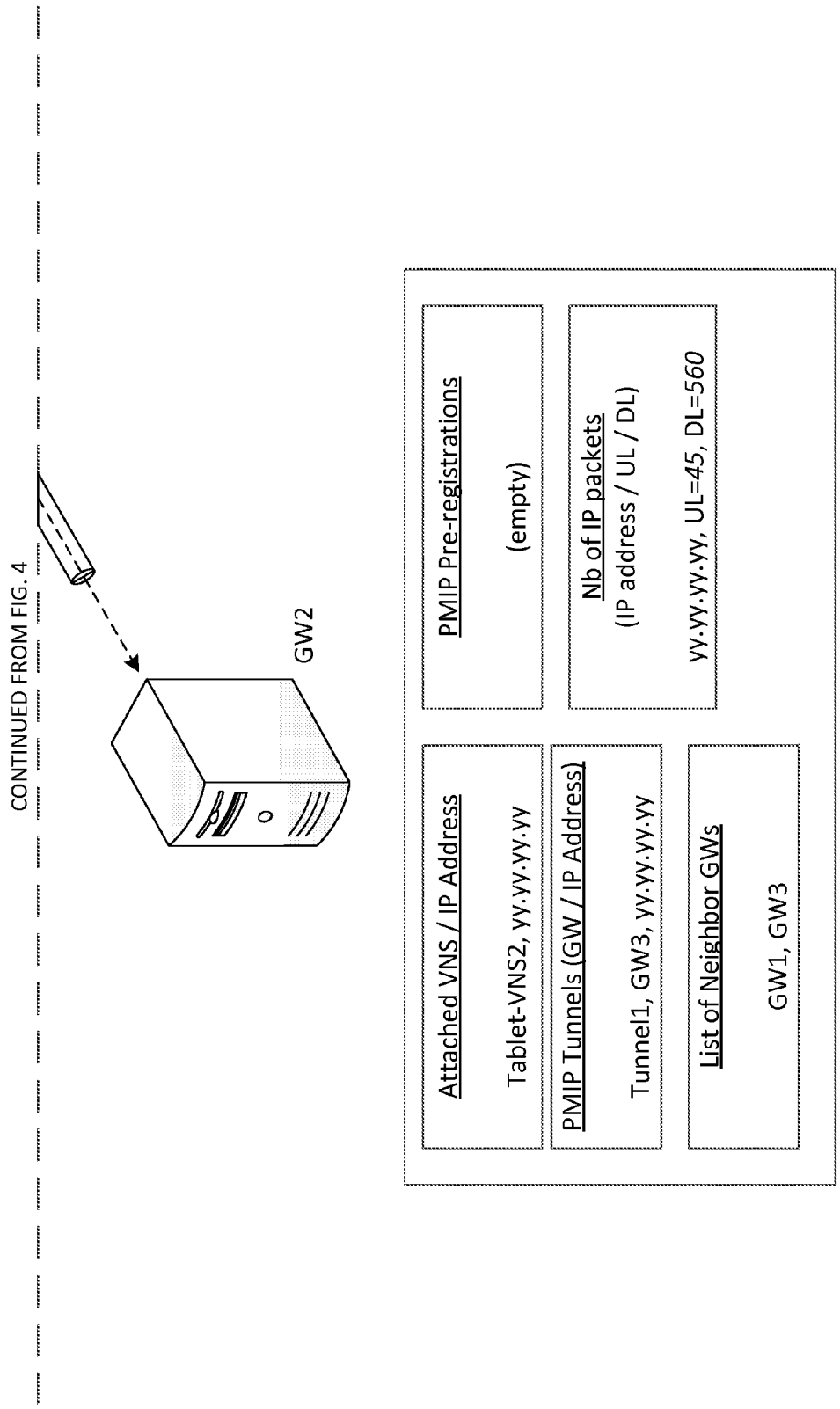

Referring to FIG. 4 and FIG. 4A, perhaps while the WTRU may be still connected to GW3, the IPTV application running on VNS1 may be closed. VNS1 may stop using xx.xx.xx.xx, which may be deprecated, so this IP address may be released and may not be configured on the WTRU anymore. VNS1 may be terminated (or "killed"). VNS2/IP address yy.yy.yy.yy may still be configured and/or deprecated. VNS3/IP address zz.zz.zz.zz may still be configured. The FTP download using yy.yy.yy.yy may still be running on VNS2. Twitter may still be running on VNS3. Since xx.xx.xx.xx may be released/not used anymore, among other reasons, GW3 may close the PMIP tunnel with GW1 which was handling traffic for VNS1/xx.xx.xx.xx. GW3 may remove xx.xx.xx.xx from its list of attached VNS1. GW1 may remove the PMIP tunnel on its end and may release xx.xx.xx.xx.

Embodiments contemplate a virtual network stack identifier. The VNS's identity may (and perhaps in some embodiments must) uniquely identify the VNS. Both WTRU's identity, perhaps in addition to the VNS's specific number, may be used together to uniquely identify the VNS. For example, a VNS may be identified by using the WTRU's identity, perhaps in addition to a random number, and/or an increasing number assigned by the WTRU may be used to create the unique VNS's identity.

One or more embodiments contemplate network stack virtualization, perhaps alternatively or additionally to DMM. In some embodiments, Network Stack Virtualization may address issues in a different manner than DMM. For example, the extra processing added at the access GW to handle DMM may be more complex than the processing contemplated with network stack virtualization. In the network stack virtualization example below, it is assumed that the WTRU has already connected to Access Gateway AG1 and has obtained an IP address (IP1). The WTRU has then moved to AG2 and has obtained another IP address (IP2). Then, the WTRU has moved to AG3. By way of example, and not limitation, embodiments contemplate an example VNS technique, such as:

WTRU may do a HO to AG3
AG3 may detect that VNS1 and/or VNS2 may have done a HO
AG3 may learn that via e.g., an attachment procedure (and/or via a database in the network)
AG3 may execute a HO procedures for VNS1 (e.g. tunnel created with AG1) to maintain session continuity)
AG3 may execute a HO procedures for VNS2, perhaps as well (e.g. tunnel created with AG2)
VNS3 may be created on the WTRU. An IP address (IP3) may be assigned by AG3
New flows may be initiated on VNS3/IP3/AG3

In the aforementioned example, embodiments may assume that a network-based solution (e.g. PMIP or GTP) may be used. For a client-based solution (e.g. MIP), the same concept for network stack virtualization may be used, however, the HO procedure may be handled on the device by the VNS themselves when a HO is detected, for example.

Embodiments contemplate Network Stack Virtualization Usage. Most of example scenarios are illustrated herein using network-based solutions but they may also apply to client-based solutions. VNSs may be created the same way; perhaps the tunneling may be handled differently (and in some embodiments perhaps only the tunneling may be handled differently), going from the Access GW to the WTRU.

Embodiments contemplate Network Stack Virtualization in a DMM-Enabled Network. FIG. 5 illustrates an example of how VNSs may be handled. A WTRU may first be connecting to an anchor node (shown as Access GW 1). At this point, a VNS (VNS_1) may be created. The WTRU may be moving toward another anchor node (shown as Access GW 2). When the WTRU connects to Access GW 2, another VNS may be created (VNS_2). VNS_1 may remain anchored to Access GW1 although the WTRU may now be connected to Access GW 2. VNS_2 may be anchored at Access GW 2. VNS_1 IP flows may be maintained since a tunnel may be created between the 2 Access GWs (illustrated with network-based solution). The two VNSs may be handled separately.

A WTRU which does a handover from Access GW 1 to Access GW 2, as shown in FIG. 5 may be using one interface (and in some embodiments perhaps only one interface). In such scenarios, some or all active flows may be redirected through Access GW 2. DMM may be enabled in the network.

Figure 6:
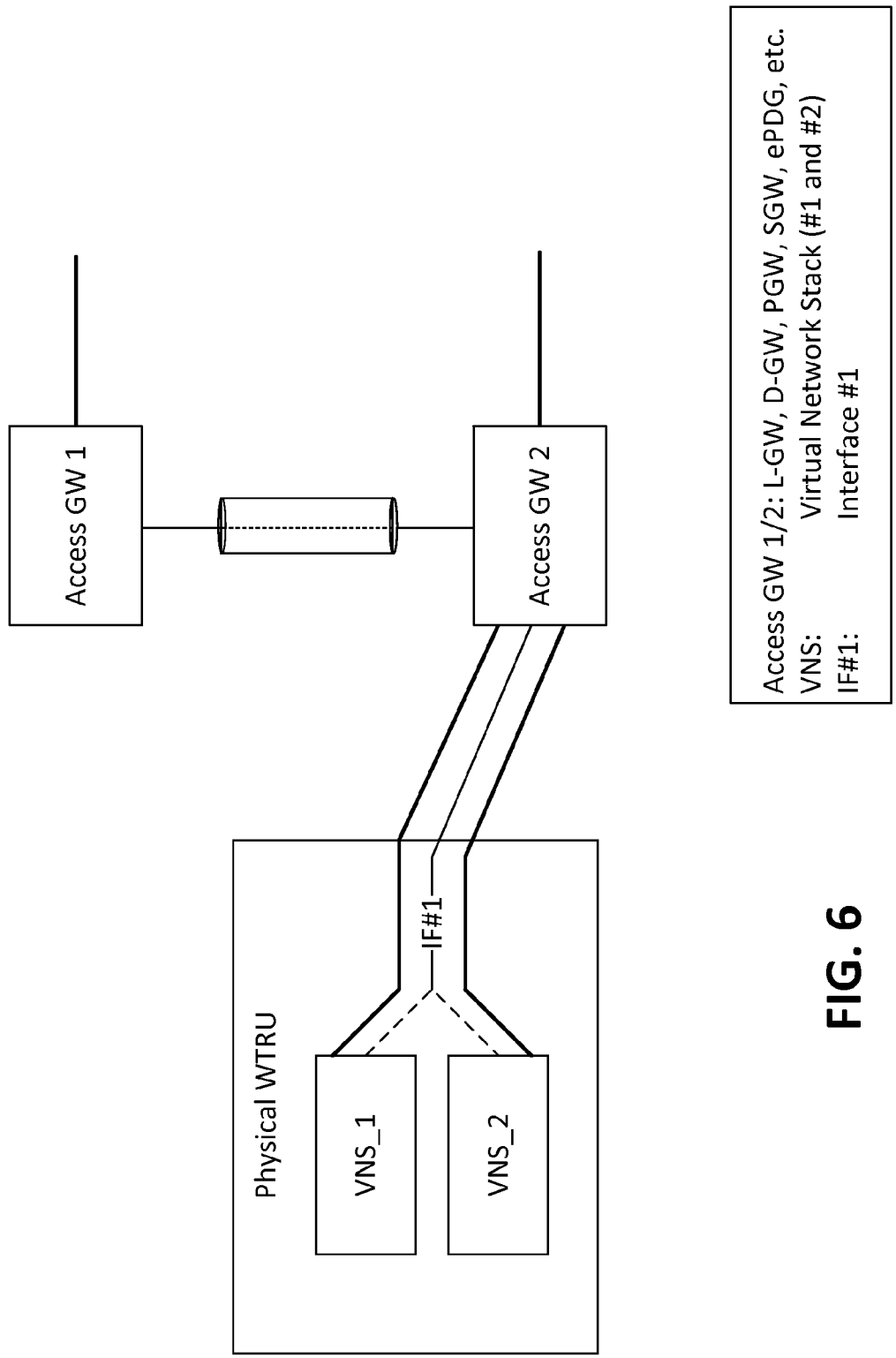
FIG. 6 is an example block diagram of a virtual network stack representation with a single interface consistent with embodiments.

FIG. 6 illustrates an example of a WTRU using one interface in e.g. a DMM environment (and perhaps in some embodiments only one interface). In this context, the access GWs may behave as anchor nodes. The WTRU may connect to the Access GW 1 and may create VNS_1. The WTRU may then move to Access GW 2 and may create VNS_2. In some embodiments, the direct connection to the Access GW 1 may be lost, however a tunnel between the two Access GWs may assure that connectivity may be maintained with Access GW 1. The WTRU may then have two IP addresses and two VNSs configured on its interface (perhaps as enabled by DMM, as described herein). The VNS_1 connectivity may be maintained even if not directly connected anymore with Access GW 1. The WTRU's identifier associated with the VNSs may be the same, however the VNSs may have their own identifier. FIG. 6 illustrates a network-based solution (e.g. DMM), in which the WTRU may be connected to at least two Anchor Nodes (e.g., Access GWs). In some embodiments, at least one physical WTRU may use at least one interface. In some embodiments, at least two VNS may be created. (VNS_1 created while connecting to AG1 and VNS_2 created while connecting to AG2)

In some embodiments, the access GW 1 may be configured to redirect the traffic of VNS_1 to VNS_2, perhaps using the Network Stack Virtualization concept, for example. In some embodiments, the access GW 1 may be configured to redirect the WTRU's traffic through the current attachment point of the WTRU, (e.g. the access GW 2), perhaps without the VNS concept, for example.

Figure 7:
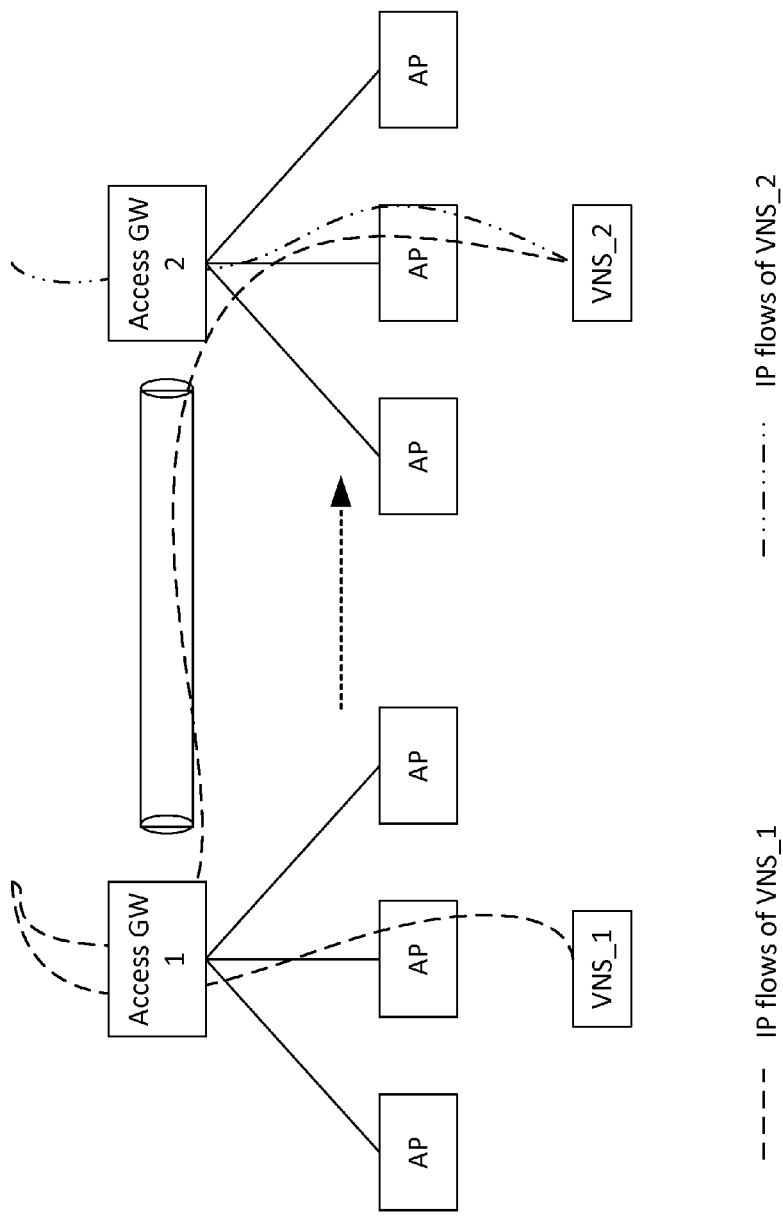
FIG. 7 is an example block diagram of flow mobility between virtual network stacks consistent with embodiments.

Embodiments contemplate Network Stack Virtualization & Flow Transfer in DMM-Enabled Network (e.g. a Network-Based Solution). FIG. 7 illustrates how network stack virtualization may be used to support flow mobility between VNSs. A VNS can transfer its flows to another VNS. A WTRU may be connecting to Access GW 1. At this point, a VNS (VNS_1) may be created. The WTRU may be moving toward Access GW 2. When the WTRU connects to Access GW 2, another virtual network stack may be created (VNS_2). VNS_1 flows may remain anchored to Access GW 1 although its flows (specific flows or all flows) may be transferred to VNS_2. VNS_1 IP flows may be maintained since a tunnel may be created between the two Access GWs (illustrated with network-based solution). VNS_2 flows may be anchored at Access GW 2.

A WTRU using two interfaces to simultaneously connect to Access GW 1 and Access GW 2, as shown in FIG. 7, may move a subset of its flows, e.g. some flows may continue to reach VNS_1 via Access GW 1 while others may be re-directed toward VNS_2 via Access GW 2.

Figure 8:
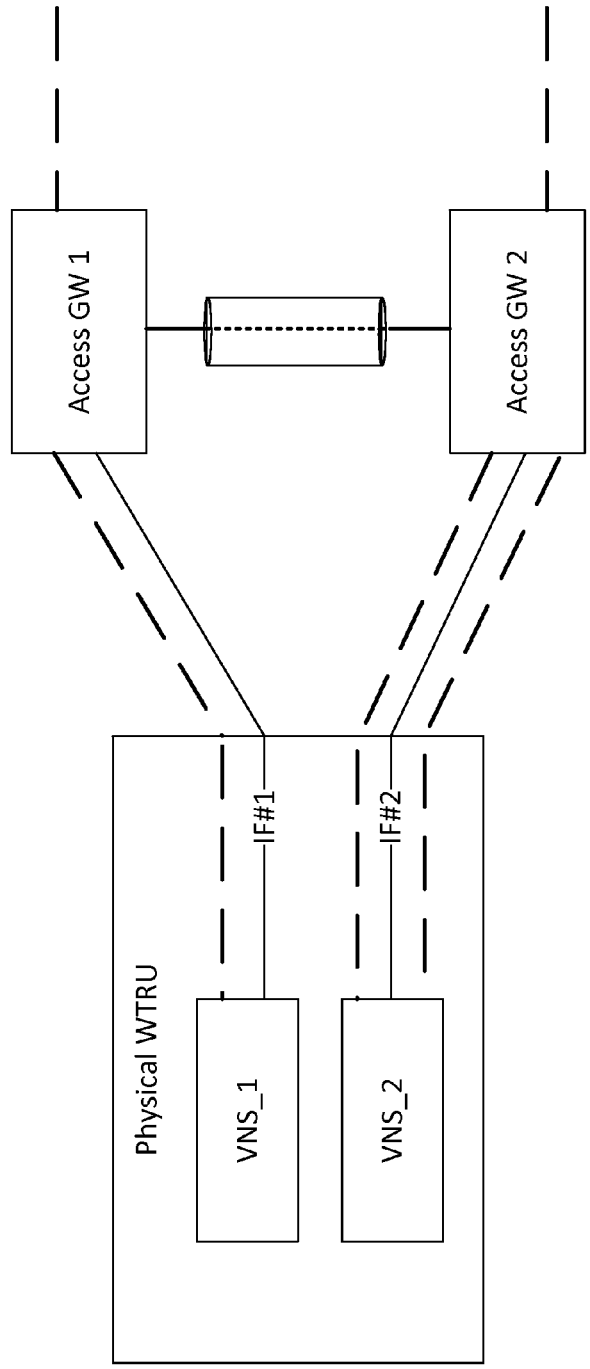
FIG. 8 is an example block diagram of virtual network stacks representation with two interfaces consistent with embodiments.

FIG. 8 illustrates another example of NB-IFOM but this time in a DMM environment and using VNSs. The WTRU may be using two interfaces simultaneously. Each interface may be connected to a different Access GW (anchor node). For each of these connections, a VNS may be created. The two Access GWs may act as anchor nodes that have allocated two different IP addresses to the WTRU, e.g. one per VNS.

Using the DMM capabilities, the anchor nodes may detect the other anchor nodes where a peer VNS (e.g. another VNS on the same WTRU) may be registered. Entries may be added to the tunneling table on each anchor node. The WTRU's identifier may be the same in each entry while the VNSs may have their own identifier (in fact, the VNS's identifier may contain the WTRU's identifier, as discussed herein). The anchor nodes may be ready to redirect flows if needed or useful. The Access GW 1 may, for example, detect congestion on the link to VNS_1 so it may redirect flow 1, destined to VNS_1, to VNS_2 via Access GW 2. Flow1 traffic from VNS1 may be sent to the network via VNS_2, Access GW 2, and/or Access GW 1.

Continuing to refer to FIG. 8, in an example network-based solution (e.g. DMM and NB-IFOM). In some embodiments, the WTRU may be connected to at least two Anchor Nodes (e.g., Access GWs). In some embodiments, at least one physical WTRU may use at least two interfaces. In some embodiments, at least two VNS may be created. For example, VNS_1 may be created, perhaps while connecting to AG1, among other scenarios. VNS_2 may be created, perhaps while connecting to AG2, among other scenarios. In some embodiments, a flow associated to VNS_1 may be redirected to VNS_2, for example via AG2. The example of FIG. 8 demonstrates that network stack virtualization may be compatible with existing features. The abstraction level added with network stack virtualization may make it possible to support future features, e.g. IUT, perhaps using the same example presented herein and/or perhaps with the VNSs being located on different physical WTRUs. The at least two VNSs may be identified as "peers" in one or more contemplated ways.

Figure 9:
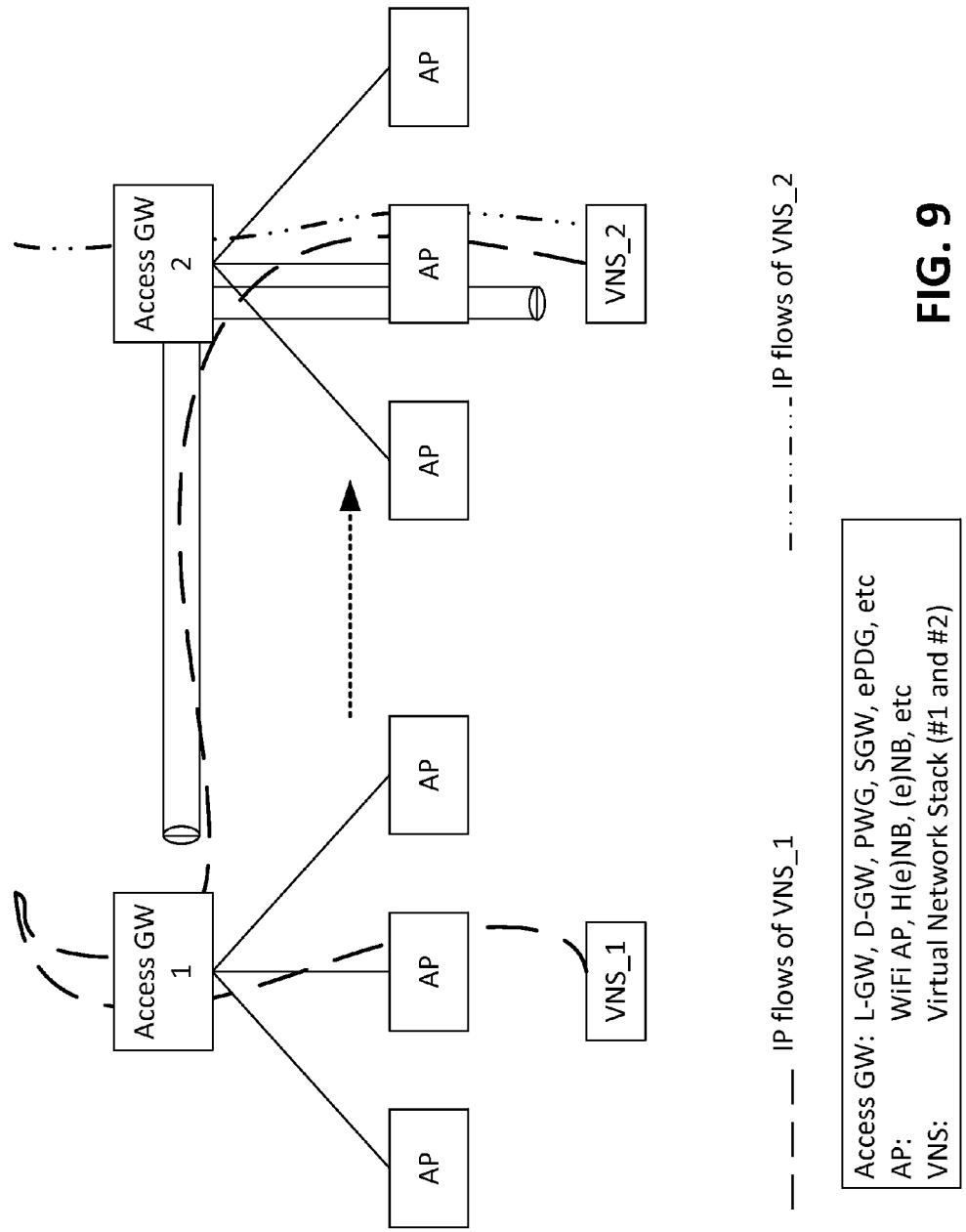
FIG. 9 is an example block diagram of flow mobility between virtual network stacks consistent with embodiments.

Embodiments contemplate Network Stack Virtualization & Flow Transfer in DMM-Enabled Network (e.g. a Client-Based Solution). Alternatively or additionally to the embodiments in which tunnels may be created between the Access GWs (anchor nodes), tunnels may be created between the VNSs and the anchor nodes that are anchoring the transferred flows. An example of this is illustrated in FIG. 9 using flow mobility as an example. A flow from VNS_1 may be transferred to VNS_2. A tunnel may be created between VNS_2 and the node anchoring the transferred flow (Access GW 1). Since VNS_2 may be directly connected to the Access GW 2, the tunnel to Access GW 1 may be represented through Access GW 2.

Figure 10:
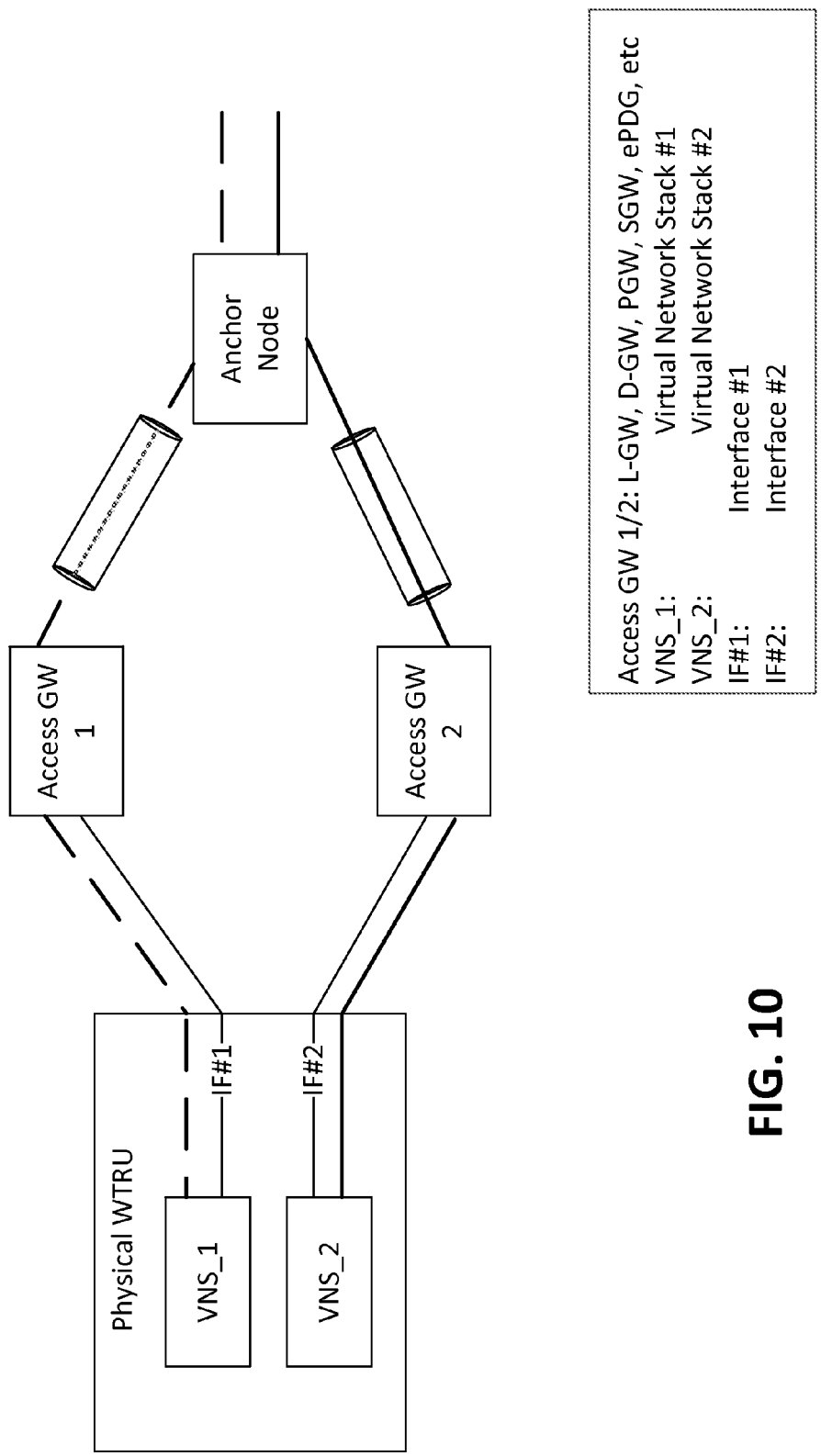
FIG. 10 is an example block diagram of virtual network stacks representation with two interfaces consistent with embodiments.

Embodiments contemplate Network Stack Virtualization & NB-IFOM in a Macro Network Scenario (perhaps not DMM). FIG. 10 illustrates an example of NB-IFOM in a macro network environment, using VNSs. DMM may not be enabled in this example. The example shows that network stack virtualization may be applied to regular macro networks as well.

The WTRU may be using two interfaces simultaneously. Each interface may be connected to a different Access GW. For each of these connections, a VNS may be created. One anchor node may be used which may allocate two different IP addresses to the WTRU, one per VNS (alternatively, the same IP address may be allocated over both interfaces, for example). Two entries may be added to the anchor node's tunneling table. The WTRU's identifier may be the same in each entry while the VNSs may have their own identifier (in fact, the VNS's identifier may contain the WTRU's identifier, as previously discussed).

Using the VNS concept, the anchor node may be configured to redirect flows, using filters for example, between the VNSs. Without the VNS concept, the anchor node may be configured to redirect flows between the two interfaces/IP addresses registered to the same WTRU. Using network stack virtualization in this case may add a level of abstraction in the network. e.g. the anchor node may apply the flow transfer between two VNSs instead of between interfaces of a single WTRU. The VNSs may be on the same WTRU or not (same WTRU in this example). The same processing may be done at the anchor node (additional processing may need to be done for security purposes however, for the mobility part and flow transfer, it may be identical). For example, although only one VNS per interface is illustrated on this diagram, in some embodiments multiple VNSs may be created per interface. In FIG. 10, in a network-based scenario (e.g. a macro network), and in some embodiments, the WTRU may be connected to at least one Anchor Node. In some embodiments, at least one physical WTRU may use at least two interfaces/two IP addresses. In some embodiments, at least two VNS may be created. For example, VNS_1 may be created, perhaps while connecting to AG1, among other scenarios. VNS_2 may be created, perhaps while connecting to AG2, among other scenarios.

Figure 11:
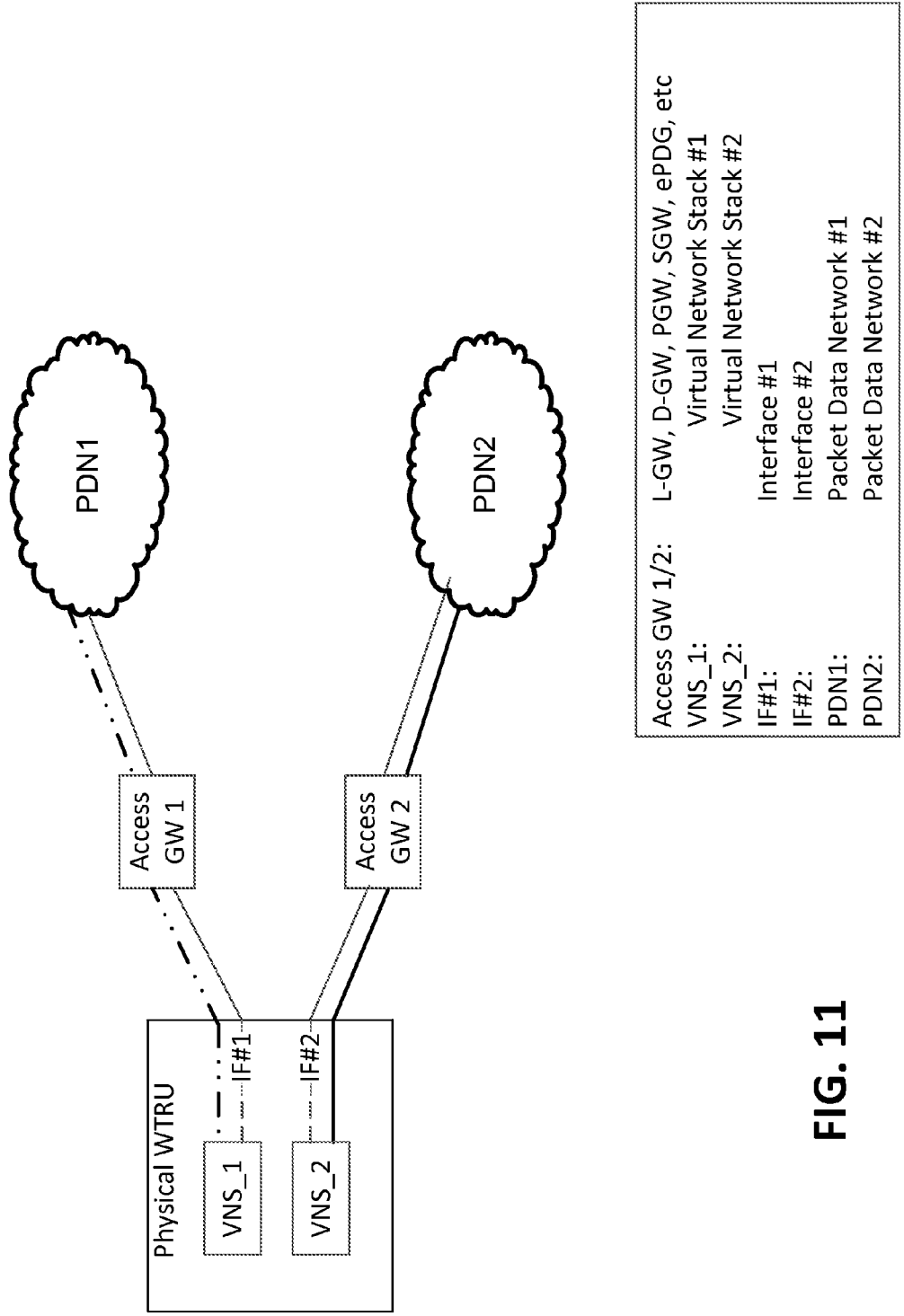
FIG. 11 is an example block diagram of virtual network stacks representation with two interfaces consistent with embodiments.

Embodiments contemplate Network Stack Virtualization with Different PDNs Scenario. In one or more embodiments, the VNSs may be connected to the same PDN or to different PDNs. In the case of different PDNs, if it may be useful to support mobility or bandwidth management features, tunneling between the anchor nodes when the network-based solution is used may be allowed in some way (or in some embodiments must be allowed in some way). When the mobile-based solution is used, the tunneling is from the WTRU thus the WTRU may be allowed to access the PDNs (or in some embodiments must be allowed to access the PDNs). Two VNSs connected to different PDNs are illustrated in FIG. 11. In some embodiments, multiple PDNs may be accessed. In some embodiments, one physical WTRU may use at least two interfaces. In some embodiments at least two VNS may be created. For example, VNS_1 may be created, perhaps while connecting to AG1-PDN1, among other scenarios. Also by way of example, VNS_2 may be created, perhaps while connecting to AG2-PDN2, among other scenarios.

Embodiments contemplate Network Stacks Virtualization and Inter-RAT Scenarios. In such scenarios, network stack virtualization may be used with inter-RAT mobility. The WTRU may connect over the interface #1 (IF#1) to an LTE network, for example. An IP address may be obtained from the PGW and may be associated to VNS1. The WTRU may move out of the LTE network coverage and a HO to the UMTS network may be done. Another virtual network stack may be created (VNS2) and an IP address may be obtained from the GGSN that may be associated to it. The normal HO procedure for inter-RAT mobility may be done to maintain the session continuity of VNS1. DMM-like functionality may then be obtained, e.g. the WTRU may get anchored to the closest anchor node, perhaps while maintaining session continuity for the existing flows anchored to the PGW. Embodiments contemplate that the reverse scenario may work in the same way, e.g. the WTRU connecting to the UMTS network and then moving to the LTE network and may be anchored in the two networks. An example scenario of Network Stacks Virtualization and Inter-RAT is illustrated in FIG. 12.

Figure 12:
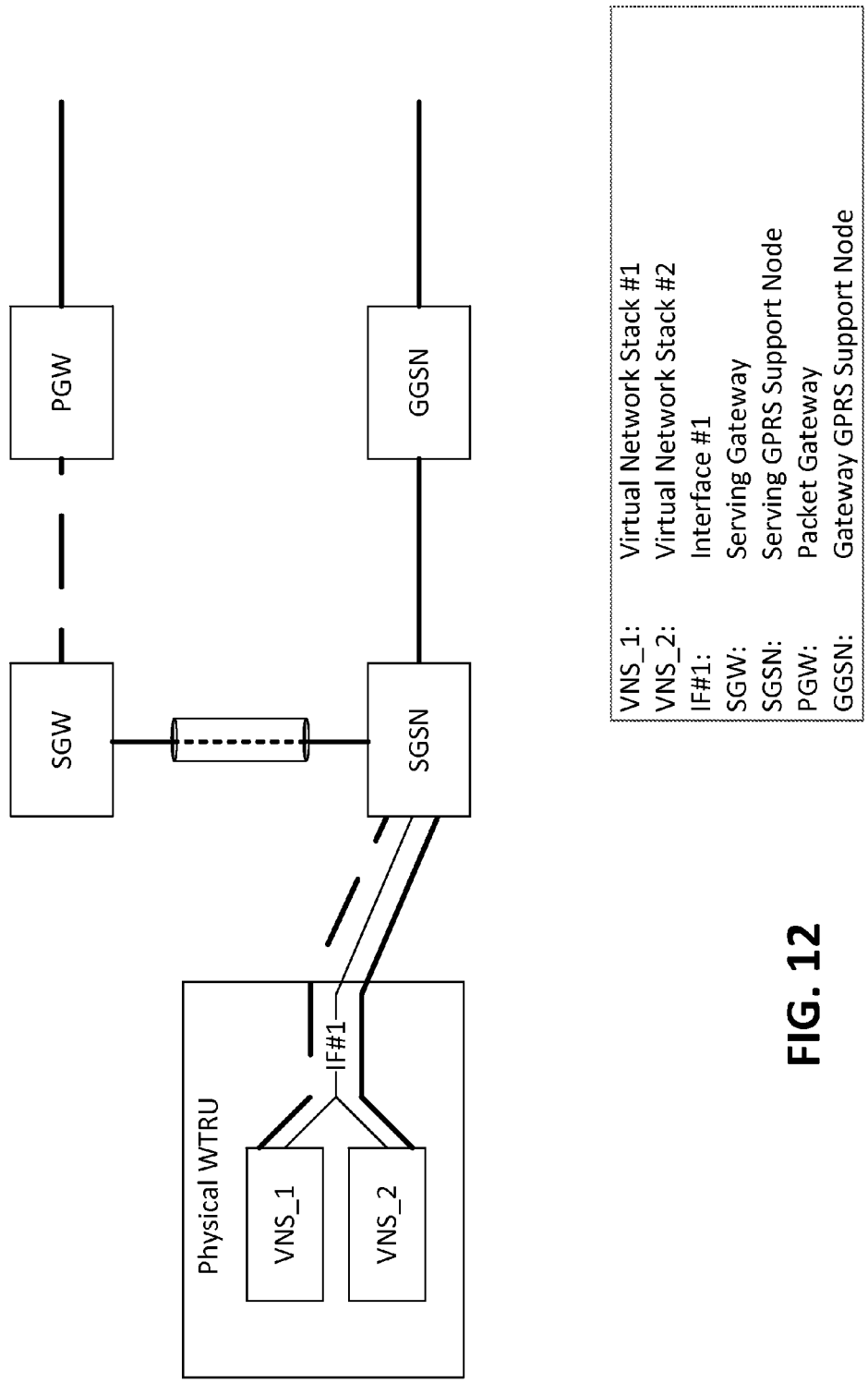
FIG. 12 is an example block diagram of virtual network stacks with inter-RAT mobility consistent with embodiments.

In FIG. 12. Inter-RAT Mobility with Network Stack Virtualization may be enabled. For example, session continuity may be maintained, perhaps when a hand over (HO) from SGW to SGSN (or reverse direction), and/or a new (e.g., fresh) IP address may be obtained from GGSN/PGW (e.g., new or fresh anchor). In some embodiments, one physical WTRU may use at least one interface. In some embodiments, at least two VNS may be created. For example, VNS_1 may be created, perhaps while connecting to SGW-PGW, among other scenarios. Also by way of example, VNS_2 may be created, perhaps while connecting to SGSN-GGSN, among other scenarios.

Embodiments contemplate Virtual Network Stack Management. In one or more embodiments, it may be expected that a WTRU may receive some configuration locally from the user. For example, the user may configure its preferences for WiFi APs. Some configuration may also be pre-configured by the operator on the WTRU, e.g. on the SIM card. In addition, the network operator may configure policies on the WTRU via, for example, the ANDSF server. These policies may be downloaded when the WTRU powers on and/or dynamically during the WTRU's operations. This may be the normal policy configuration. Embodiments contemplate the extension of the policy configuration to the Virtual Network Stack concept. In some embodiments, it is contemplated to support the policy configuration by grouping some policies in a "general" section, which may apply to the WTRU itself, e.g. all virtual network stacks defined on the same physical WTRU. In addition to this general section, a sub-section per virtual network stack may be specified. Each virtual network stack specific sub-section may contain specific policies for the corresponding VNS. The virtual network stack configuration may depend on to which gateway the VNS may be anchored. For example a VNS anchored to the PGW in the core network may end up being configured differently than a VNS anchored at an L-GW. Examples of policies are shown below:

Embodiments contemplate General policies (applying to some or all VNSs), such as one or more of:
 Mobility features enabled on the physical WTRU
 Ordered list of preferred networks: and/or
 Flow segregation policies Embodiments contemplate VNS specific policies, such as preferred list of APs, or the like. Embodiments also contemplate application-based policies, such as which applications may be allowed or prohibited from using the VNS, etc.

In one or more embodiments, the Connection Manager, or a similar entity may be used to manage VNS. The connection manager may have one or more functions, such as:
 VNS contention management. This function may control how multiple VNS contending for the same access (modem) resources may be allowed access to these resources. Operator and user policies may determine how such contention management actually works.
 VNS-to-application visibility. To manage application access to VNSs, while at the same time maintaining backward compatibility to the interfaces such as the socket interface, the Connection Manager may ensure that a VNS may be visible to applications which are allowed to use it (or in some embodiments perhaps only to those applications); and/or
 Intra-VNS management: the management of the protocol stack within the VNS, subject to user, operator and application policies.

As an example of how operator policies may occur, consider the ANDSF policy management process currently used by 3GPP. Embodiments contemplate that it may be useful for the ANDSF MO for LocationUpdate to be updated to support those changes for VNS. In one or more embodiments, there may be a separate MO for each VNS and possibly a separate one for the WTRU as a whole. These may be maintained at the WTRU and synchronized with the ANDSF Server, perhaps at regular intervals of time and/or in response to a trigger, which may occur at the WTRU or in the Network, for example. Alternately or additionally, the current MO may be extended by creating branches specific to each VNS. In one or more embodiments, the synchronization procedures that may be used currently may be extended to synchronize one or more of the individual MOs. The selection of the MOs to be updated may be indicated within the query process between the ANDSF Client and ANDSF Server, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), the WTRU in communication with a wireless communication network, the WTRU comprising:
 a memory; and
 a processor, the processor in communication with the memory, the processor configured, to:
  create a first virtual network stack (VNS);
  obtain a first internet protocol (IP) address from a first node;
  associate the first IP address with the first VNS;
  establish a first connection corresponding to the first VNS;
  initiate a first application on the first VNS;
  initiate a first IP flow between the WTRU and the first node, the first IP flow corresponding to the first application;
  initiate a handover to a second node of the wireless communication network;
  create a second VNS;
  obtain a second IP address from the second node;
  associate the second IP address with the second VNS, the first VNS operating simultaneously with the second VNS;
  associate a first interface with the first VNS and the second VNS;
  initiate a second IP flow between the WTRU and the second node via a second connection corresponding to the second VNS, the second IP flow corresponding to a second application using the second VNS, the first connection corresponding to the first VNS being revocable and managed under a first Quality of Service (QoS) and the second connection corresponding to the second VNS being revocable and managed under a second QoS, wherein the revocability of the first connection corresponding to the first VNS is independent from the revocability of the second connection corresponding to the second VNS, and the first QoS is different from the second QoS; and
  forward, the first IP flow between the WTRU and the first node via at least one of: a tunnel between the first node and the second node, the first interface and the second node, the first VNS and the second node, or the second VNS and the second node.

2. The WTRU of claim 1, wherein the processor is further configured to:
 initiate a handover to a third node;
 create a third VNS;
 obtain a third IP address from the third node;
 associate the third IP address with the third VNS; and
 initiate a third IP flow between the WTRU and the third node via the third VNS, the third IP flow corresponding to a third application using the third VNS.

3. The WTRU of claim 2, wherein at least of: the first node, the second node, or the third node is an access gateway of the wireless communication network.

4. The WTRU of claim 2, wherein the first application, the second application, and the third application are the same application.

5. The WTRU of claim 2, wherein at least two of the first application, the second application, or the third application are different applications.

6. The WTRU of claim 2, wherein the processor is further configured to associate one or more permissions with at least one of: the first VNS, the second VNS, or the third VNS.

7. The WTRU of claim 1, wherein the processor is further configured to create the first VNS upon at least one of:
   a determination that the first application requires the first VNS;
   receipt of a request from the wireless communication network to create the first VNS; or
   a determination that a configured policy requires the first VNS.

8. A method performed by a wireless transmit/receive unit (WTRU), the WTRU in communication with a first node and a second node of a network, the method comprising:
   creating a first virtual network stack (VNS) on the WTRU;
   obtaining a first internet protocol (IP) address from the first node;
   associating the first IP address with the first VNS;
   establishing a first connection corresponding to the first VNS;
   creating a second VNS on the WTRU;
   obtaining a second internet protocol (IP) address from the second node;
   associating the second IP address with the second VNS, the first VNS operating simultaneously with the second VNS;
   associating a first interface with the first VNS and the second VNS;
   establishing a second connection corresponding to the second VNS, the first connection corresponding to the first VNS being revocable and managed under a first Quality of Service (QoS) and the second connection corresponding to the second VNS being revocable and managed under a second QoS, wherein the revocability of the first connection corresponding to the first VNS is independent from the revocability of the second connection corresponding to the second VNS, and the first QoS is different from the second QoS; and
   forwarding a first IP flow between the WTRU and the first node via at least one of: a tunnel between the first node and the second node, the first interface and the second node, the first VNS and the second node, or the second VNS and the second node.

9. The method of claim 8, wherein the first node is associated with a first radio access technology (RAT) and the second node is associated with a second RAT.

10. The method of claim 8, wherein the first node is in communication with a first packet data network (PDN) and the second node is in communication with a second PDN.

* * * * *